United States Patent [19]
Link et al.

[11] Patent Number: 5,924,344
[45] Date of Patent: *Jul. 20, 1999

[54] LATHE

[75] Inventors: Helmut Link, Aichwald;
Guenther-Heinrich Trautmann,
Kirchheim, both of Germany

[73] Assignee: Index-Werke GmbH & Co. KG Hahn & Tessky, Esslingen, Germany

[*] Notice: This patent is subject to a terminal disclaimer.

[21] Appl. No.: 08/902,879

[22] Filed: Jul. 30, 1997

Related U.S. Application Data

[63] Continuation-in-part of application No. 08/730,609, Oct. 8, 1996, which is a continuation of application No. PCT/EP96/00537, Feb. 9, 1996.

[30] Foreign Application Priority Data

Feb. 10, 1995 [DE] Germany .............................. 195 04 371
Nov. 27, 1996 [DE] Germany .............................. 196 49 016

[51] Int. Cl.$^6$ ...................................................... B23B 9/00
[52] U.S. Cl. .............................................. 82/129; 82/132
[58] Field of Search ............................. 82/129, 132, 141, 82/137

[56] References Cited

U.S. PATENT DOCUMENTS

| | | | |
|---|---|---|---|
| 3,339,440 | 9/1967 | Tsuda | 82/129 |
| 3,691,485 | 9/1972 | Maurer | 82/3 |
| 3,726,162 | 4/1973 | Sato | 82/3 |
| 3,990,133 | 11/1976 | Schalles et al. | |
| 4,524,654 | 6/1985 | Lucey | 82/3 |
| 4,779,318 | 10/1988 | Henderson | 29/38 B |
| 5,042,126 | 8/1991 | Simonin | 29/38 B |

FOREIGN PATENT DOCUMENTS

| | | |
|---|---|---|
| 0 298 672 | 1/1989 | European Pat. Off. |
| 0 433 722 | 6/1991 | European Pat. Off. |
| 0 516 103 | 12/1992 | European Pat. Off. |
| 25 28 001 | 9/1976 | Germany |
| 30 02 647 | 9/1980 | Germany |
| 37 03 173 | 4/1988 | Germany |

Primary Examiner—Andrea L. Pitts
Assistant Examiner—Mark Williams
Attorney, Agent, or Firm—Barry R. Lipsitz; Ralph F. Hoppin

[57] ABSTRACT

In order to improve a lathe, in particular, a multiple-spindle lathe, comprising at least one workpiece spindle arranged on a machine frame and rotatable about a spindle axis, this workpiece spindle projecting with its front end into an operating area, and a tool slide with a longitudinal slide element guided for displacement in Z-direction parallel to the spindle axis in a longitudinal guide means located outside the operating area and arranged on a slide stand of the machine frame and with a cross slide arranged in the operating area and displaceable in X-direction transversely to the spindle axis in relation to the longitudinal slide element, this cross slide being guided on a cross slide guide means arranged at a front end of the longitudinal slide element and movable by means of a cross feed gear, such that the tool slide as a whole is constructed in as space-saving a manner as possible and, in particular, requires little space in the operating area in order to create the possibility of using several tool slides on one workpiece spindle, it is suggested that the longitudinal slide element bear a cross feed motor for the cross feed gear in an area located outside the operating area and that this cross feed motor drive the cross feed gear by means of a rotary transmission element extending in a longitudinal direction of the longitudinal slide element.

31 Claims, 23 Drawing Sheets

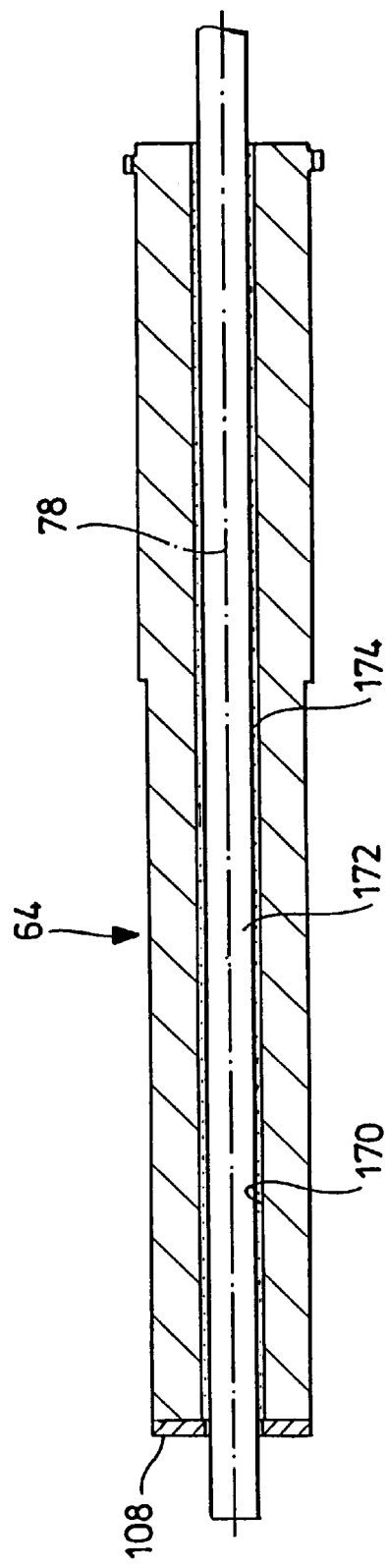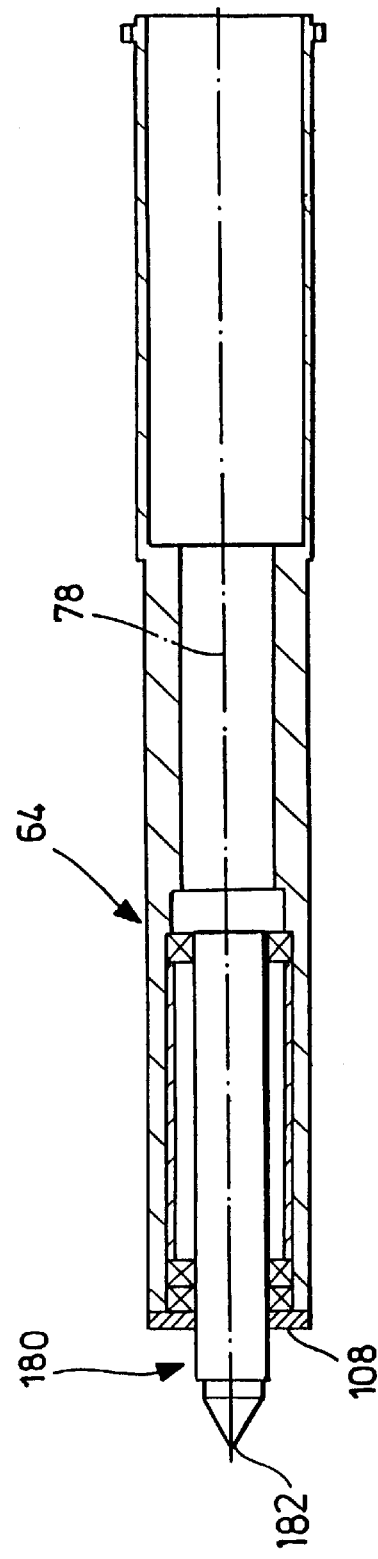

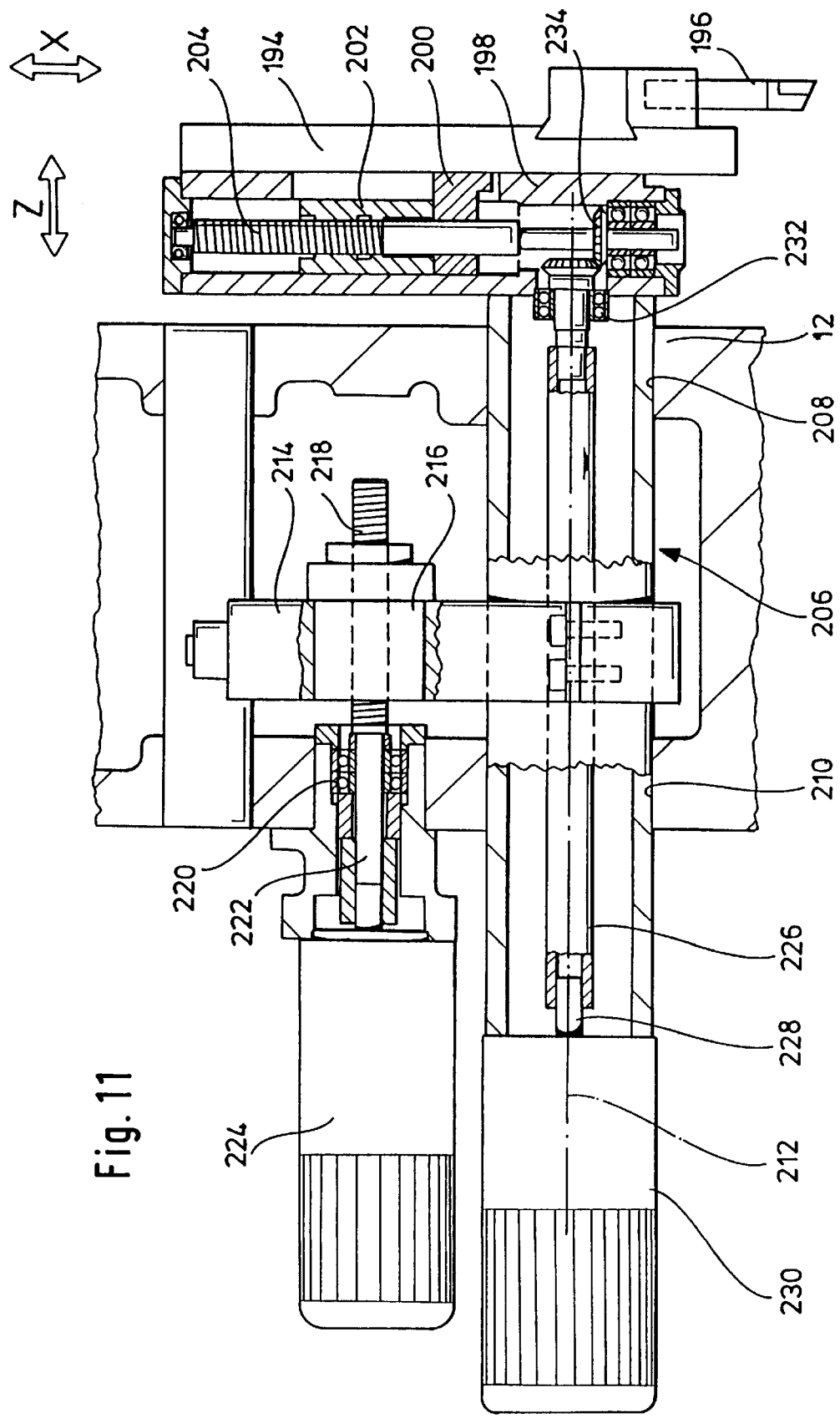

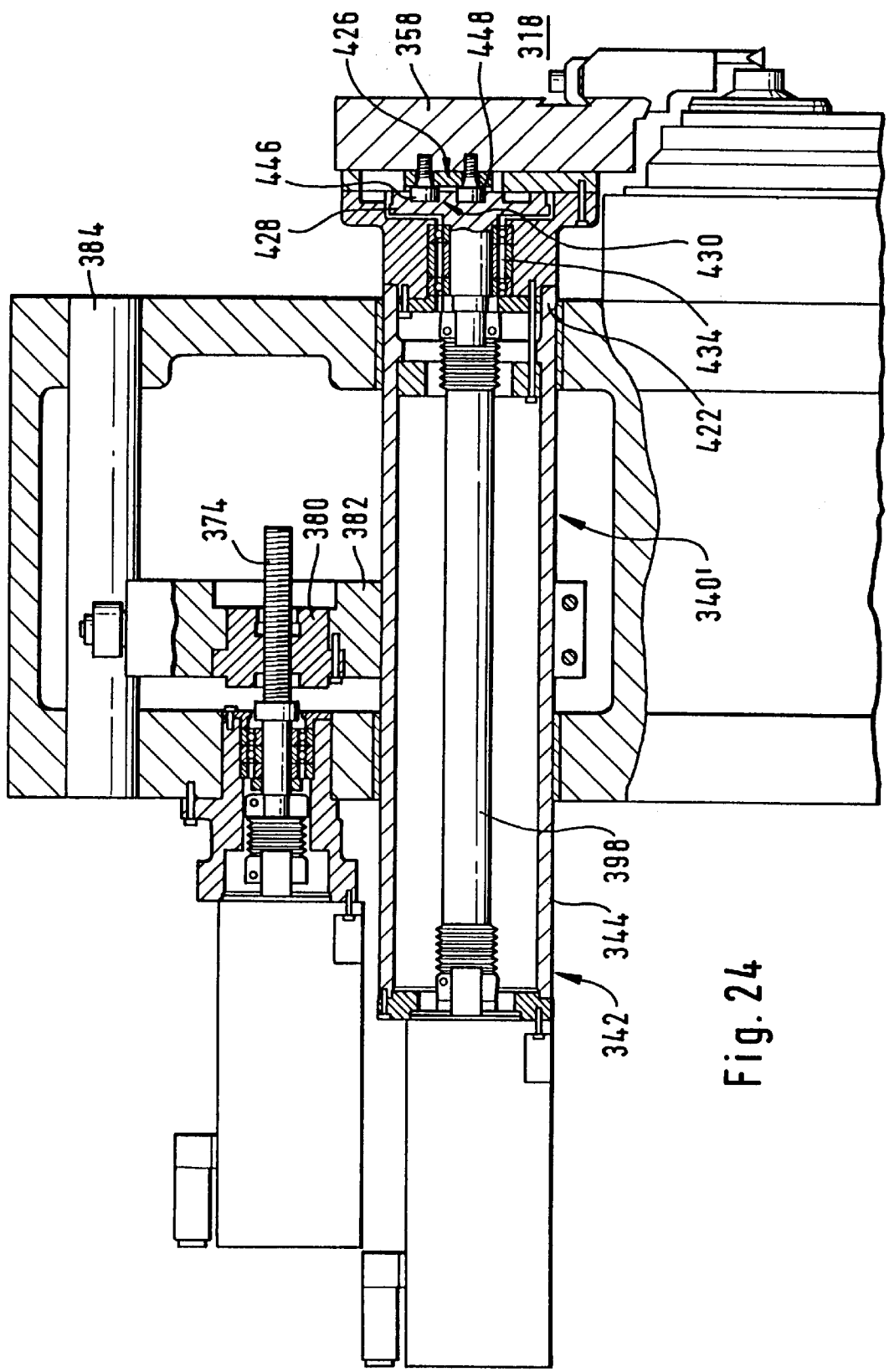

1
LATHE

This application is a continuation-in-part of co-pending, commonly assigned U.S. patent application Ser. No. 08/730,609 filed on Oct. 8, 1996, which is a continuation of International PCT application PCT/EP96/00537 filed on Feb. 9, 1996.

BACKGROUND OF THE INVENTION

The invention relates to a lathe, in particular, a multiple-spindle lathe, comprising at least one workpiece spindle which is arranged on a machine frame and rotatable about a spindle axis and which projects with its front end into an operating area, and a tool slide with a longitudinal slide element guided for displacement in Z-direction parallel to the spindle axis in a longitudinal guide means located outside the operating area and arranged on a slide stand of the machine frame and with a cross slide which is arranged in the operating area and displaceable in X-direction transversely to the spindle axis in relation to the longitudinal slide element and which is guided on a cross slide guide means arranged at a front end of the longitudinal slide element and movable by means of a cross feed gear.

A lathe of this type is known, for example, from EP-A-0 433 722. With this lathe, the cross feed motor is, however, arranged on the cross slide guide means and thus in the operating area. Such a solution has the disadvantage that it requires considerable constructional space and thus creates problems when, where possible, several tool slides are intended to be usable on one workpiece spindle.

SUMMARY OF THE INVENTION

The object underlying the invention is therefore to improve a lathe of the generic type such that the tool slide as a whole is constructed in as space-saving a manner as possible and, in particular, requires little space in the operating area in order to create the possibility of using several tool slides on one workpiece spindle.

This object is accomplished in accordance with the invention, in a lathe of the type described at the outset, in that the longitudinal slide element bears a cross feed motor for the cross feed gear in an area located outside the operating area and that this cross feed motor drives the cross feed gear by means of a rotary transmission element extending in a longitudinal direction of the longitudinal slide element.

The advantage of the inventive solution is to be seen in the fact that by shifting the cross feed motor out of the operating area a space-saving solution has been created which enables the tool slides to be constructed in as space-saving a manner as possible and thus several tool slides to be arranged close to one another.

In principle, the rotary transmission element can be arranged next to the longitudinal slide element. For reasons of a space-saving construction it is, however, particularly advantageous when the rotary transmission element penetrates an interior of the longitudinal slide element.

With respect to the type of rotary transmission element, no details have been given. A particularly advantageous embodiment provides, for example, for the rotary transmission element to be a shaft. In order to be able to compensate for tolerances as well in a particularly advantageous manner, it is expediently provided for the shaft to be designed as a universal-joint shaft.

Within the scope of the invention it would, for example, be conceivable to arrange the cross feed motor, for example, directly adjacent to the cross slide guide means. It is, however, particularly favorable when the longitudinal slide element extends in Z-direction away from the operating area beyond the longitudinal guide means and bears the cross feed motor on a side of the longitudinal guide means facing away from the operating area. In this case, the cross feed motor is arranged such that the constructional volume required for this does not represent any impairment whatsoever of the longitudinal guide means and thus likewise allows as optimum and space-saving a construction as possible in the region of the longitudinal guide means.

A particularly favorable arrangement may be achieved when the longitudinal slide element penetrates the slide stand of the machine frame bearing the longitudinal guide means and when the cross feed motor is arranged on a side of the slide stand facing away from the operating area.

In principle, the cross feed motor could be arranged to the side of the longitudinal slide element. The construction is, however, particularly space-saving when the cross feed motor is arranged on an end region of the longitudinal slide element facing away from the operating area.

In this respect, it is particularly favorable when the cross feed motor is arranged on an end face of the longitudinal slide element facing away from the operating area and thus extends in continuation of the longitudinal slide element.

Furthermore, it is of advantage, particularly in order to avoid any type of additional gearing, when the cross feed motor is arranged with its motor shaft approximately parallel to the longitudinal direction of the longitudinal slide element so that a non-rotatable connection to the rotary transmission element can be provided in a simple manner.

With respect to the design of the longitudinal slide element, no details whatsoever have so far been given. For example, any type of construction of a longitudinal slide element is conceivable. In the present case, it has, however, proven to be particularly favorable when the longitudinal slide element is of a tube-like or column-like design.

In this case, a particularly favorable and space-saving configuration is offered when a motor housing of the cross feed motor is arranged approximately in alignment with the tube-like longitudinal slide element.

With respect to the arrangement of the workpiece spindle, no further details have so far been given. One advantageous embodiment, for example, provides for the slide stand to also bear the at least one workpiece spindle and thus the longitudinal slide element, in particular, is arranged on the slide stand so as to be aligned approximately parallel to the at least one workpiece spindle.

In an additional embodiment, it is provided for the slide stand to be arranged on a side of the operating area located opposite the workpiece spindle. In this embodiment, it is possible to arrange the longitudinal guide element only in this slide stand.

In the case of a slide, in particular a compound slide, arranged on the side of the at least one workpiece spindle, it is provided in a space-saving and inexpensive solution to likewise arrange the workpiece spindle, in addition, in a slide stand which, for its part, likewise bears in addition a longitudinal guide element so that at least two workpiece slides are in a position to operate on one and the same workpiece spindle, in the case of a multiple-spindle lathe on one and the same workpiece spindle located in one of the spindle stations.

With respect to the design of the cross feed gear, no further details have so far been given. One advantageous embodiment, for example, provides for the cross feed gear to have a feed screw spindle extending in X-direction as well as arranged on the cross slide guide means and a spindle nut connected to the cross slide. A solution of this type represents a simple and, in particular, highly accurate possibility for moving the cross slide.

In this respect, it is preferably provided for the feed screw spindle to be drivable via a bevel gearing so that a drive via the cross feed motor arranged on the longitudinal slide element can be brought about in a simple manner.

Alternatively to providing a cross feed gear with a feed screw spindle, an additional, advantageous embodiment provides for the cross feed gear to have a lifting cam and a cam follower which interact to move the cross slide.

In this respect, it is preferably provided for the lifting cam to be mounted so as to be rotatable in relation to the longitudinal slide element and the cross slide guide means and for the cam follower to be held on the cross slide so that a rotation of the lifting cam causes an advancing movement of the cross slide.

The lifting cam can be designed in the most varied of ways. It is, for example, conceivable for the lifting cam to be a hollow cam, i.e. to have a body with a cavity, the inner wall of which forms the lifting surfaces.

Alternatively thereto, it is conceivable to design the lifting cam as a bead cam.

In order to bring about a defined positioning of the cross slide, it is preferably provided for the cam follower to make contact with two lifting surfaces of the lifting cam effective in opposite feed directions and thus to be positioned exactly by means of the lifting cam not only in one feed direction but also in the opposite feed direction.

Such a cam follower is preferably designed such that it has a pair of cam support elements, for example a pair of rollers, wherein each abuts on one of the two lifting surfaces of the lifting cam acting in respectively opposite directions and thus clearly defines the position of the cross slide.

With respect to the assembly of the cross slide guide means on the longitudinal guide element, no further details have so far been given. A particularly favorable embodiment provides, for example, for the cross slide guide means to be mounted on the longitudinal guide element from a side located opposite the operating area. This means that the cross feed gear, in particular, can be arranged on the cross slide guide means as an integral structural element without interfering with the assembly of the cross slide guide means.

With respect to the arrangement of the tools on the inventive cross slide, it has proven to be particularly advantageous when the cross slide has a receiving means for tools on an upper side facing away from the longitudinal slide element so that the mounting of the tools is made particularly easy.

With respect to the possibilities of a feed movement in Z-direction, no further details have been given in conjunction with the preceding explanations concerning the individual embodiments. It would, for example, be conceivable in an advantageous embodiment to set a defined position of the tool in the Z-axis, for example separately for each workpiece, by displacing and fixing the longitudinal slide element in position.

It is, however, particularly advantageous when, for moving the longitudinal feed element, a longitudinal feed gear is arranged, in particular, on the slide stand and outside the operating area and this likewise does not interfere with as space-saving an arrangement of the tool slide as possible.

In this respect, it is particularly expedient when the longitudinal feed gear is arranged next to the longitudinal slide element so that the longitudinal slide element itself need not take into account the constructional volume of a longitudinal feed gear integrated into it.

In this connection it is particularly expedient when, for reasons of saving on space, a longitudinal feed motor is arranged on a side of the longitudinal feed gear facing away from the operating area.

The longitudinal feed motor may be arranged in a particularly favorable and space-saving manner on a side of the slide stand facing away from the operating area.

In this respect, it is particularly favorable when the longitudinal feed motor extends approximately parallel to the longitudinal direction of the longitudinal slide element.

With respect to the exact guidance and, in particular, the non-rotatable guidance of the longitudinal slide element, no further details have so far been given. It would, for example, be conceivable to also design the longitudinal guide means such that it represents at the same time a support against torque acting on the longitudinal slide element. This does, however, make a large-volume design of the longitudinal guide means necessary. For this reason, it is particularly expedient when the longitudinal slide element is guided in the longitudinal guide means in the longitudinal direction and is non-rotatably guided by an additional torque support against any rotation about the Z-direction.

In this respect, it is particularly favorable when the torque support has a holding arm which extends transversely to the longitudinal slide element and bears a guide member running on a guide path held on the slide stand. With this additional torque support, particularly high torques can be absorbed with a small constructional volume.

The torque support having the holding arm may be combined particularly favorably with the longitudinal feed gear when the longitudinal feed gear engages on the holding arm.

In the most favorable case, the longitudinal feed gear is designed, for example, such that it comprises a feed screw spindle extending in Z-direction and a spindle nut held on the holding arm.

An additional, advantageous embodiment of a multiple-spindle lathe comprises a machine frame, a drum rotatable about an essentially horizontal axis of rotation in relation to the machine frame, workpiece spindles arranged on the drum in respective individual positions and having spindle axes which are aligned essentially parallel to the axis of rotation and are movable in the direction of their spindle axis and independently of one another relative to the drum by means of linear drives during the machining of a workpiece, and tools arranged on tool supports for the machining of the workpieces held in the workpiece spindles.

In this multiple-spindle lathe, it is provided for each workpiece spindle to be allocated its own linear drive arranged on the drum for moving it in the direction of the spindle axis and for the workpiece spindle to be constantly coupled to the linear drive.

Such a solution has the great advantage that with it as exact a positioning as possible of the respective workpiece spindle in the direction of its spindle axis is possible and that all the problems are eliminated which result from the fact that each workpiece spindle is driven in each individual spindle station by another respective linear drive.

In addition, this solution has the great advantage that all the problems are eliminated which result due to the respective connection between the individual linear drives and the individual workpiece spindles which has to be released and re-created.

Finally, the inventive solution also has the great advantage for the reduction in piecework rates and acceleration of the drum indexing that there is no necessity, as is the case in DE-OS 25 28 001, to return the workpiece spindle to its initial position prior to every drum indexing. In the case of the inventive solution, the position of the respective workpiece spindle in the direction of its spindle axis can, in principle, be maintained during the drum indexing or the new position already be approached insofar as there is no risk of collision with a stationary tool.

A particularly advantageous solution of the invention provides for the workpiece spindle to be positionable and fixed in position in a defined manner with respect to its position in the direction of the spindle axis by means of the linear drive. This solution has the great advantage, in addition, in comparison with the cam-controlled linear drives that forces can be absorbed in directions opposite to one another in the direction of the spindle axis and thus, for example, copy-turning operations are also possible, during which machining forces occur in the two directions opposite to one another.

A particularly advantageous embodiment of such a linear drive provides for this to be designed as a spindle drive and comprise a drive motor seated on the drum, wherein a longitudinal positioning of the workpiece spindle may be carried out with this drive motor and the spindle drive, this positioning representing at the same time, on its termination, a fixing in position of the workpiece spindle.

A particularly advantageous embodiment of an inventive multiple-spindle lathe provides for the workpiece spindle to be movable in the direction of its spindle axis by means of a numerically controlled shaft member. Such a numerically controlled shaft member has, on the one hand, the usual, known advantages resulting from the numerical control and, in addition, the further advantage that high-speed movements of the workpiece spindle can be realized in a simple manner and, in particular, can also be realized in a simple manner independently of the other respective spindles so that a high-speed movement is already possible with one of the workpiece spindles of the drum while with the other workpiece spindle of the drum a numerically controlled shaft movement takes place during machining.

The linear drive for each workpiece spindle could, in principle, be arranged everywhere at any location on the drum. For example, it would be possible to arrange the linear drive in relation to the axis of rotation so as to be located radially inwards in relation to the respective workpiece spindles. This would, however, have the disadvantage that the workpiece spindles would have to be positioned on the drum at a relatively large distance in relation to the axis of rotation.

For this reason, a particularly advantageous embodiment provides for the linear drive to be arranged on the drum so as to be located radially outwards in relation to the respective workpiece spindle.

In order to make a particularly compact construction for the spindle drum possible, a further, advantageous embodiment provides for the linear drive to be arranged so as to be angularly offset in relation to the workpiece spindle so that the linear drive is not located exactly radially outwards in relation to the respective workpiece spindle but offset through an angle and thus it can again be arranged so as to be offset, in addition, in the direction towards the axis of rotation.

The construction is particularly compact when a drive motor of the linear drive or the entire linear drive is arranged in an angular area between two consecutive workpiece spindles so that the space between two workpiece spindles can be utilized in an optimum manner.

With respect to the design of the workpiece spindles themselves, no further details have been given. It would, for example, be possible to provide the workpiece spindles with a flange-mounted spindle motor. It is, however, particularly advantageous when the workpiece spindle is designed as a motor spindle, i.e. a built-in motor is provided in a sleeve accommodating the workpiece spindle.

With respect to the further construction of the inventive multiple-spindle lathe, no particular details have so far been given.

Fundamentally, slides for tools are also arranged on that part of the machine frame, on which the drum is mounted, and with these tools machining of the workpieces held in the workpiece spindles takes place in individual stations, wherein the movability of the workpiece spindles in the direction of their spindle axis is used, in addition, as a Z-axis movement during the machining of the workpiece. This does not, however, exclude any Z-axis movement of the tool relative to the machine frame which is likewise provided.

However, the movability of the workpiece spindle in the direction of its spindle axis can be used particularly advantageously when at least one machining device interacting with one of the workpiece spindles is arranged on the machine frame on a side of the operating area located opposite the drum, wherein these machining devices can be designed and utilized in numerous different ways which will be described later in detail.

The machining devices are preferably designed and arranged such that they interact with the workpiece spindle, utilizing the movability of the spindle in the direction of its spindle axis.

The machining device or the machining devices can, in principle, be arranged to be stationary on the machine frame.

A particularly advantageous embodiment of the inventive multiple-spindle lathe does, however, provide for the machining device to be arranged on a support which is rotatable about an axis of rotation parallel to the axis of rotation of the drum, wherein a particularly compact construction is possible when the support is rotatable coaxially to the drum.

Such a machining device which is arranged on a support rotatable coaxially to the axis of rotation of the drum offers numerous, additional advantages in conjunction with the inventive solution since the possibility exists of using one and the same machining device not only in one station but also in several stations.

This is possible, for example, due to the fact that the support is coupled rigidly to the drum with respect to its rotational movement about the axis of rotation so that the machining device associated with a workpiece spindle remains associated and rotates together with the workpiece spindle and the possibility exists, for example, of moving the workpiece spindle together with the machining device associated with it through all the spindle stations. A rigid coupling of the rotational movement of drum and support need not be accomplished mechanically but can also be accomplished by way of a suitable control of separate drives.

Alternatively thereto, it is likewise conceivable for the support to be rotatable independently of the drum. In this way it is possible to rotate the drum and the support such that the workpiece spindle and the associated machining device are still respectively located in the same stations but do not reach these by means of a synchronous movement. It is, however, also possible to associate a machining device with different workpiece spindles.

It is particularly advantageous when separate respective drives are provided for driving the drum and the support since, in this way, the absolutely necessary mechanical connection which always hinders the fall of cuttings and the arrangement of additional tools operating, for example, radially, . . .

The provision of a separate drive for the drum and the support offers the possibility of using the operating area, in particular its section located between the end faces of the drum and the support, without any mechanical connections between drum and support and thus obtaining additional free space for the arrangement and movement of tools.

With respect to the rotatability of the drum, no further details have so far been given. It would, for example, be conceivable—as is usual in the case of conventional multiple-spindle lathes—to provide the drum with a Maltese cross rotary drive which moves the drum into individual stations rigidly arranged in relation to the machine frame and positions it in them.

It is, however, particularly advantageous when the drum is rotatable in a controlled manner as a numerically controlled shaft member since such a rotary drive for the drum offers the possibility of rotating the drum in accordance with specific angular velocity profiles and, in particular, of moving the workpiece spindles as well from one station to the next respective station or, however, also directly to a station which is located further away, which is not possible in the case of conventional positioning of the drum by means of a Maltese cross.

In the same way, it is conceivable, in the case of a rotatable support, to rotate this as well with a Maltese cross rotary drive; it is, however, even more advantageous to design the support so as to be rotatable in a controlled manner as a numerically controlled shaft member and thus construct the support to be positionable exactly with the rotary drive.

It is particularly advantageous for a large number of machining operations when the machining device is associated with one of the workpiece spindles during the machining of the workpiece and this can be positioned so as to be oppositely located in relation to the operating area since, in this position of the machining device, machining may be carried out undisturbed by the other workpiece spindles.

In this respect, it has proven to be particularly expedient when the support bears several machining devices and each machining device is arranged such that it cooperates with at least one associated workpiece spindle of the drum.

A multiple machining of the workpieces held in several workpiece spindles is thus possible, in particular, in a simple manner.

The machining device can, for example, be designed such that it can be associated with only one workpiece spindle. It is, however, particularly advantageous when the machining device is designed such that it can be associated with each workpiece spindle of the drum so that a flexible machining of workpieces is possible.

A particularly advantageous solution provides for the machining device to be aligned with a central axis coaxially to the spindle axis of the workpiece spindle associated with it during machining of the workpiece in order to create the possibility, in particular, of holding and guiding a workpiece, for example, with the workpiece spindle, on the one hand, and with the machining device, on the other hand.

Particularly in all those cases where a workpiece is intended to be held or guided by the workpiece spindle, on the one hand, and by the machining device, on the other hand, it is advantageous when the held workpiece is rotatable about the axis of rotation in the machining device synchronously with the associated workpiece spindle likewise holding the workpiece so that the workpiece can be rotated further whilst held on both sides.

The machining device can, in the simplest case, be held on the support so as to be non-displaceable. It is, however, particularly advantageous when the machining device is movable relative to the support parallel to the direction of the axis of rotation and independently of other machining devices.

Such a movability of the machining device may be realized in a particularly simple manner when each machining device has its own linear drive associated with it for moving it in the direction of the axis of rotation.

It is particularly favorable, in particular in order to be able to position the machining device as precisely as possible and position it exactly in all the rotary positions of the support, when the machining device is constantly coupled to the linear drive.

In order to make additional fixing means for the machining device in its respective position in the direction parallel to the axis of rotation unnecessary, it is advantageous when the machining device can be positioned and fixed in a defined manner with respect to its position parallel to the direction of the axis of rotation by means of the linear drive.

This may be realized in the simplest manner when the linear drive is designed as a spindle drive.

Furthermore, particularly in order to achieve high precision during the positioning of the machining devices, it is advantageous when the machining device itself is movable as a whole relative to the support in an exclusively linear manner since such a movability of the entire machining device which is possible merely in one axial direction allows a very precise guidance thereof on the support.

It is particularly expedient, especially in order to be able, on the one hand, to position the machining device precisely and, on the other hand, in order to be able to move it as quickly as possible for high-speed movements, when the machining device is movable in a direction parallel to the axis of rotation by means of a numerically controlled shaft member.

It is particularly expedient for the fall of cuttings during machining and for an optimum accessibility of the workpiece, in particular for the purpose of transferring the workpiece from the drum to the support and vice versa, as well, when a machining means of the machining devices can be positioned in front of an end face of the drum or the support facing the operating area and, in particular, delimiting it.

In this respect, it is particularly advantageous when the machining means is located in front of an end face of the drum or the support in order to thus ensure that the machining means is itself always arranged in the operating area in order to ensure an optimum accessibility.

The machining device has not been explained in greater detail in conjunction with the embodiments described thus far. A particularly advantageous embodiment, for example, provides for the machining device to comprise a tool receiving means.

Another advantageous embodiment provides for the machining device to comprise a tool receiving means for a rotating tool.

An additional embodiment provides for the machining device to comprise a tailstock.

A further, advantageous embodiment provides for the machining device to comprise a longitudinal rotary guide means.

An especially preferred embodiment provides for the machining device to be designed as a workpiece spindle, wherein the workpiece spindle can be used either for clamping and holding a workpiece or also for guiding a workpiece during longitudinal rotary machining, wherein, in the last-named case, the workpiece clamping elements serve to guide the workpiece withdrawable from this workpiece spindle, for example in the form of a stock bar, and, for example, pulls the oppositely located workpiece spindle.

In this case, the workpiece spindles are preferably designed such that they have a guide channel for the stock bars extending in axial direction thereof.

The workpiece spindle itself has not be specified in greater detail. A particularly advantageous embodiment provides for the workpiece spindle to be designed as a motor spindle.

In the case of the inventive machine, not only the drum but also the support could, in principle, always be rotatable further in one direction. In these cases, a Maltese cross rotary drive is, for example, provided—as is known from the state of the art—which always rotates the drum or the support such that the workpiece spindle or the machining device migrate from one station to the next.

Such a mode of operation does, however, have the disadvantage that the control and supply lines to be guided to the workpiece spindles and the machining devices have to be connected to these via rotary supply lines and these cause problems—in particular when transferring digital data.

For this reason, an advantageous embodiment of the inventive solution provides for the drum and/or the support to be rotatable from an initial position through a maximum angle into an end position and from this back again into the initial position and for a flexible supply line to be arranged between the machine frame and the drum or the support, respectively, which is securely connected at its ends to the machine frame, on the one hand, and to the drum or the support, on the other hand, and follows the rotary movement through the maximum angle on account of its flexibility.

This solution has the great advantage that a stationary connection to all the workpiece spindles or machining devices arranged on the drum or the support is possible and, therefore, it is also possible to activate these, for example, during the rotary movement of the drum or the support and also supply them with drive power in order to reduce the piecework rates. For example, a workpiece spindle can already be accelerated as a result to a specific rotational speed during the rotation of the drum or braked from a specific rotational speed to another speed or it is possible to move the workpiece spindle from a position required in the preceding station in a direction parallel to the axis of rotation into another position required in the next station or also to move it, for example, such that a collision with a stationary tool is avoided. The same applies for the machining devices.

Additional features and advantages of the invention are the subject matter of the following description as well as the drawings illustrating several embodiments.

BRIEF DESCRIPTION OF THE DRAWINGS

FIG. 9 shows an enlarged illustration of a fourth embodiment of an inventive machining device;

FIG. 10 shows an enlarged illustration of a fifth embodiment of an inventive machining device;

FIG. 11 shows an enlarged, sectional illustration of a section through a tool slide along line VI—VI, for example, in FIG. 2;

FIG. 24 shows a section similar to FIG. 22 of a seventh embodiment of an inventive tool slide;

DETAILED DESCRIPTION OF THE INVENTION

Figure 1:
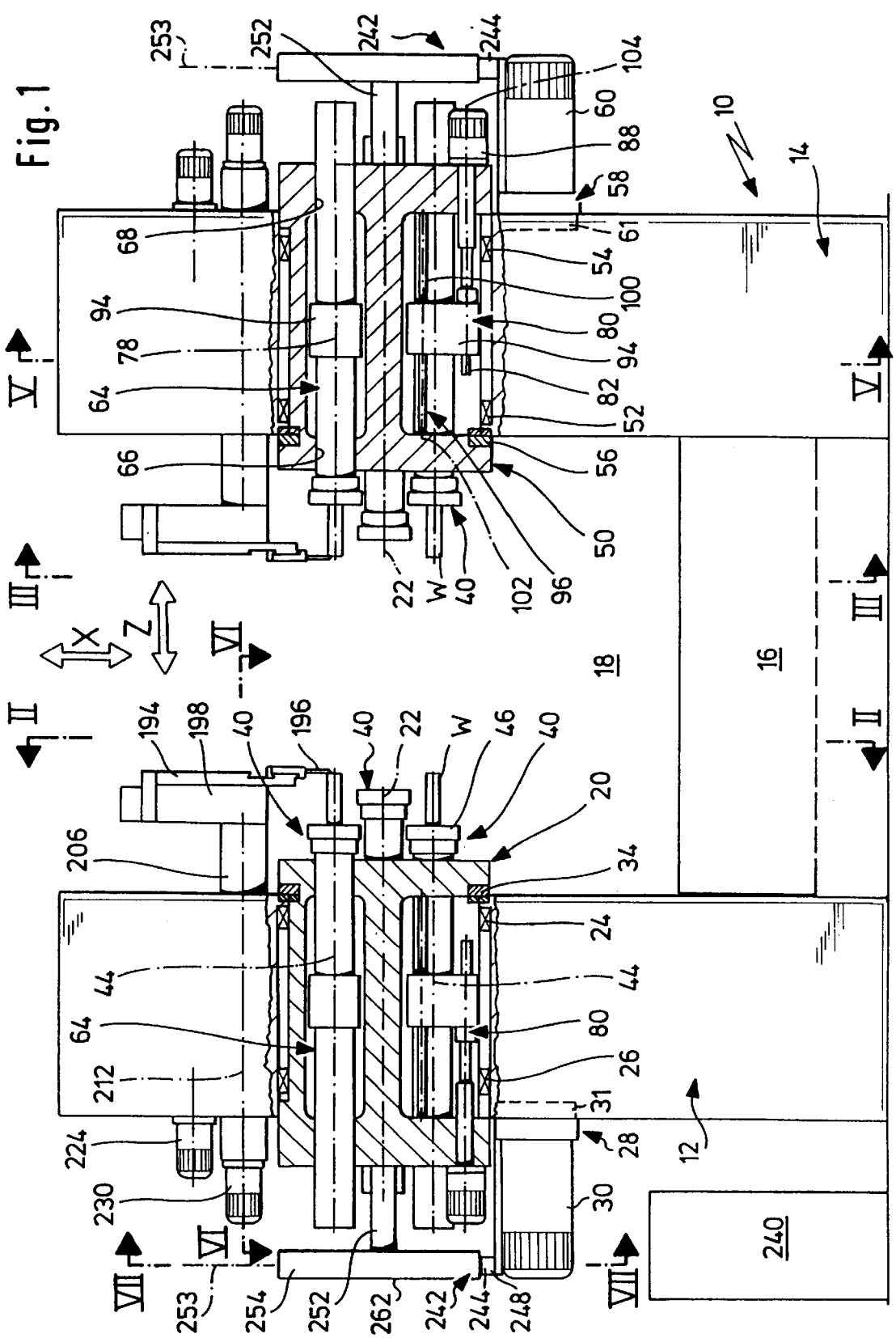
FIG. 1 shows a side view of an inventive multiple-spindle lathe in a partial section along line I—I in FIGS. 2 and 3, with machining means which are illustrated by way of example as workpiece spindles.

One embodiment of an inventive multiple-spindle lathe, illustrated in FIG. 1, has a machine frame which is designated as a whole as 10 and comprises a first stand 12 and a second stand 14 which are connected to one another by means of a base part 16. An operating area designated as a whole as 18 is located between the stands 12, 14.

A first drum designated as a whole as 20 and having a front drum bearing 24 facing the operating area 18 and a rear drum bearing 26 on a side of the first stand 12 facing away from the operating area 18 is mounted in the first stand 12 so as to be rotatable about a horizontal axis of rotation 22. A rotary drive designated as a whole as 28 and comprising a drive motor 30 and, for example, a toothed belt transmission 31, with which the drum 20 can be driven in the region of the rear drum bearing 26, is provided for rotating the drum 20. In this respect, the rotary drive 26 is preferably designed as a numerically controlled rotational shaft member, with which the drum 20 can be positioned precisely in any rotational position.

In order to fix the individual rotational positions of the drum 20, a three-part Hirth-type tooth system 34 is provided on the side of the first stand 12 facing the operating area 18 and is operative between this stand and the drum 20, the tooth system being located between the front drum bearing 24 and the operating area 18 and actuatable hydraulically.

Figure 2:
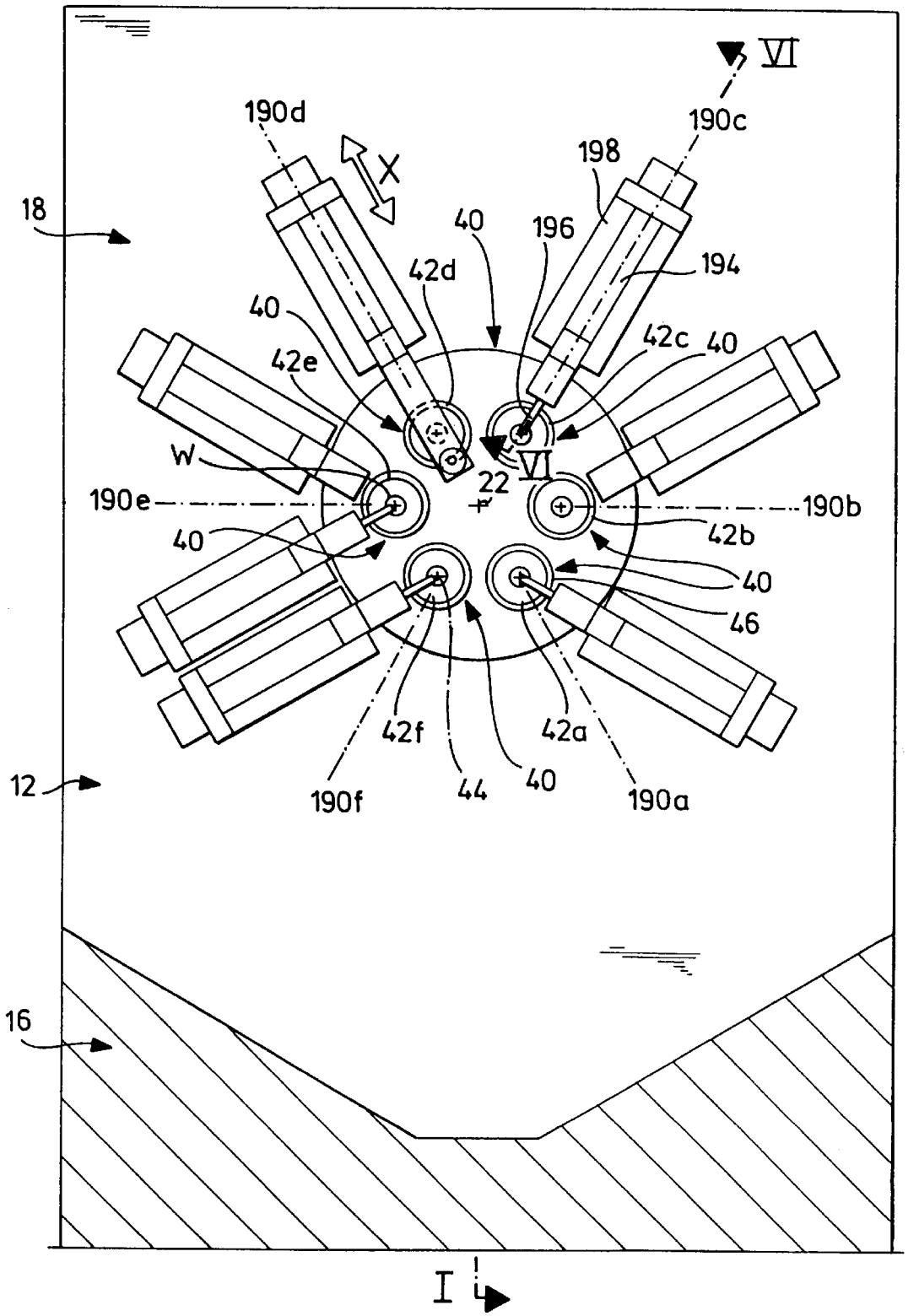
FIG. 2 shows a section along line II—II in FIG. 1.

As illustrated in FIGS. 1 and 2, a plurality of first machining devices 40, for example designed as workpiece spindles, are arranged on the drum 20 in individual positions 42*a*, 42*b*, 42*c*, 42*d*, 42*e* and 42*f*, wherein the machining devices 40 have the same radial distance from the axis of rotation 22 in each of the positions 42*a* and all the positions are located at the same angular distance around the axis of rotation 22.

All the machining devices 40 extend, in addition, with their central axis 44 parallel to the axis of rotation 22 and thus likewise in a horizontal direction and are arranged such that a machining means 46, for example, a workpiece chuck, comprised by the machining devices 40 faces the operating area 18 so that a workpiece W clamped therein can be machined in the operating area 18.

A second drum 50 is arranged in the second stand 14 as support for additional machining devices 40 and this drum is mounted in the second stand 14 by a front drum bearing 52 facing the operating area 18 and a rear drum bearing 54 on a side of the second stand 14 facing away from the operating area 18 so as to be rotatable coaxially to the axis of rotation 22. In this respect, a rotary drive 58 with a drive motor 60 and a toothed belt transmission 61, which drives the second drum 50 in the region of the rear drum bearing 54, is provided for rotating the second drum 50. The rotary drive 58 is likewise preferably designed as a numerically controlled rotational shaft member so that the drum 50 can be positioned exactly in any optional rotational position.

In order to fix the individual rotational positions of the second drum 50, a three-part Hirth-type tooth system 56 is provided on the side of the second stand 14 facing the operating area 18 and is operative between this stand and the counterdrum 50, this tooth system being located between the front drum bearing 52 and the operating area 18 and actuatable hydraulically.

Figure 3:
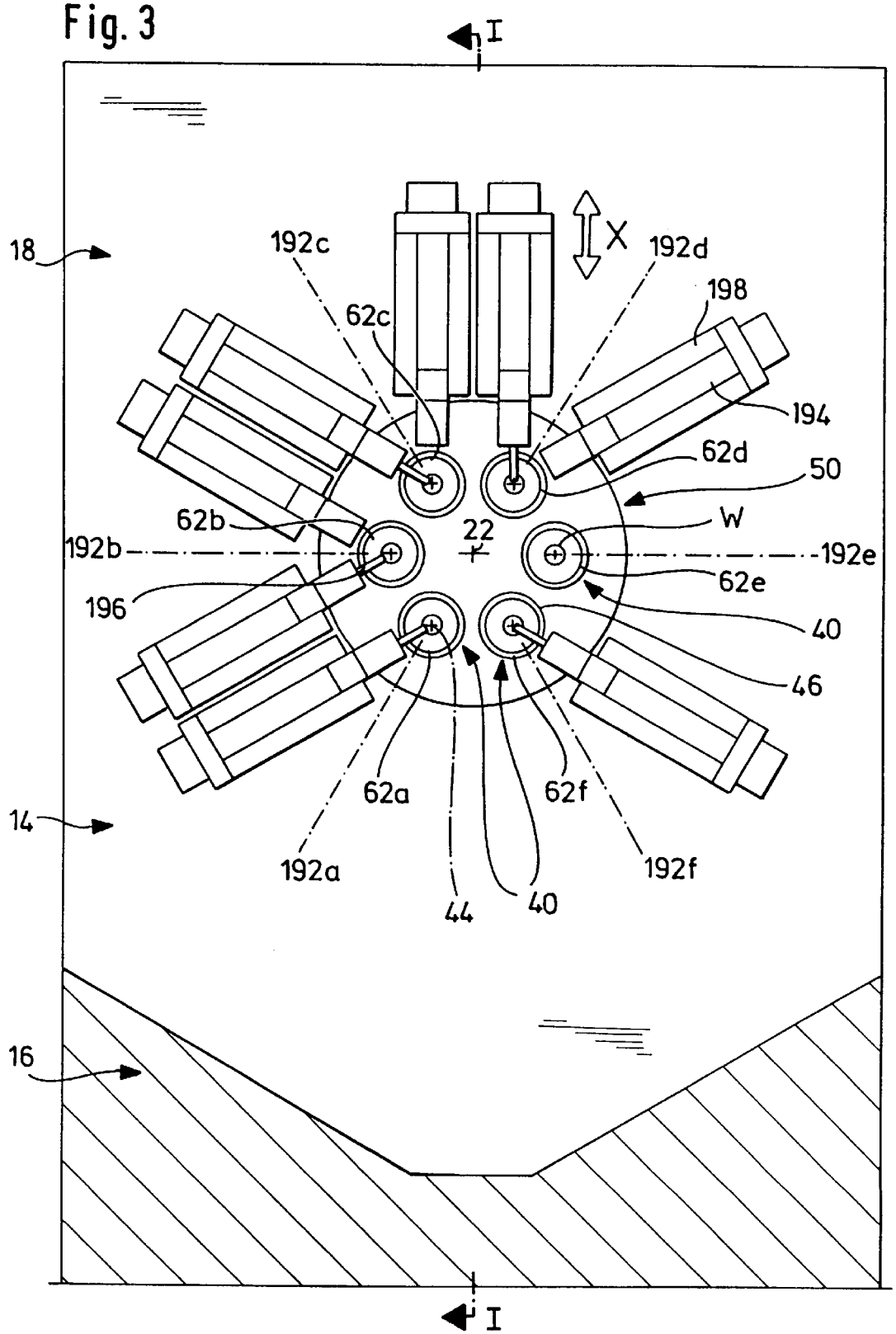
FIG. 3 shows a section along line III—III in FIG. 1.

As illustrated in FIG. 3, six positions 62*a* to *f* are provided in the second drum, wherein the individual positions 62*a* to *f* are arranged at the same radial distance from the axis of rotation 22 and, for example, at the same angular distance relative to one another as the positions 42*a* to *f*. Machining devices 40 with central axes 44 aligned parallel to the axis of rotation 22 are arranged in these positions 62*a* to *f* and these can be of the most varied types.

Each of the machining devices 40 is arranged in a sleeve 64, wherein the sleeve 64 penetrates guide openings 66 and 68 in a front bearing plate 70 and a rear bearing plate 72, respectively, of the first drum 20 or the second drum 50 and is securely installed in the guide openings 66 and 68 or is guided by linear guide means 74 and 76 in the direction of its central axis 78, which coincides with the central axis 44 of the machining devices 40, for displacement parallel to the axis of rotation 22.

Figure 4:
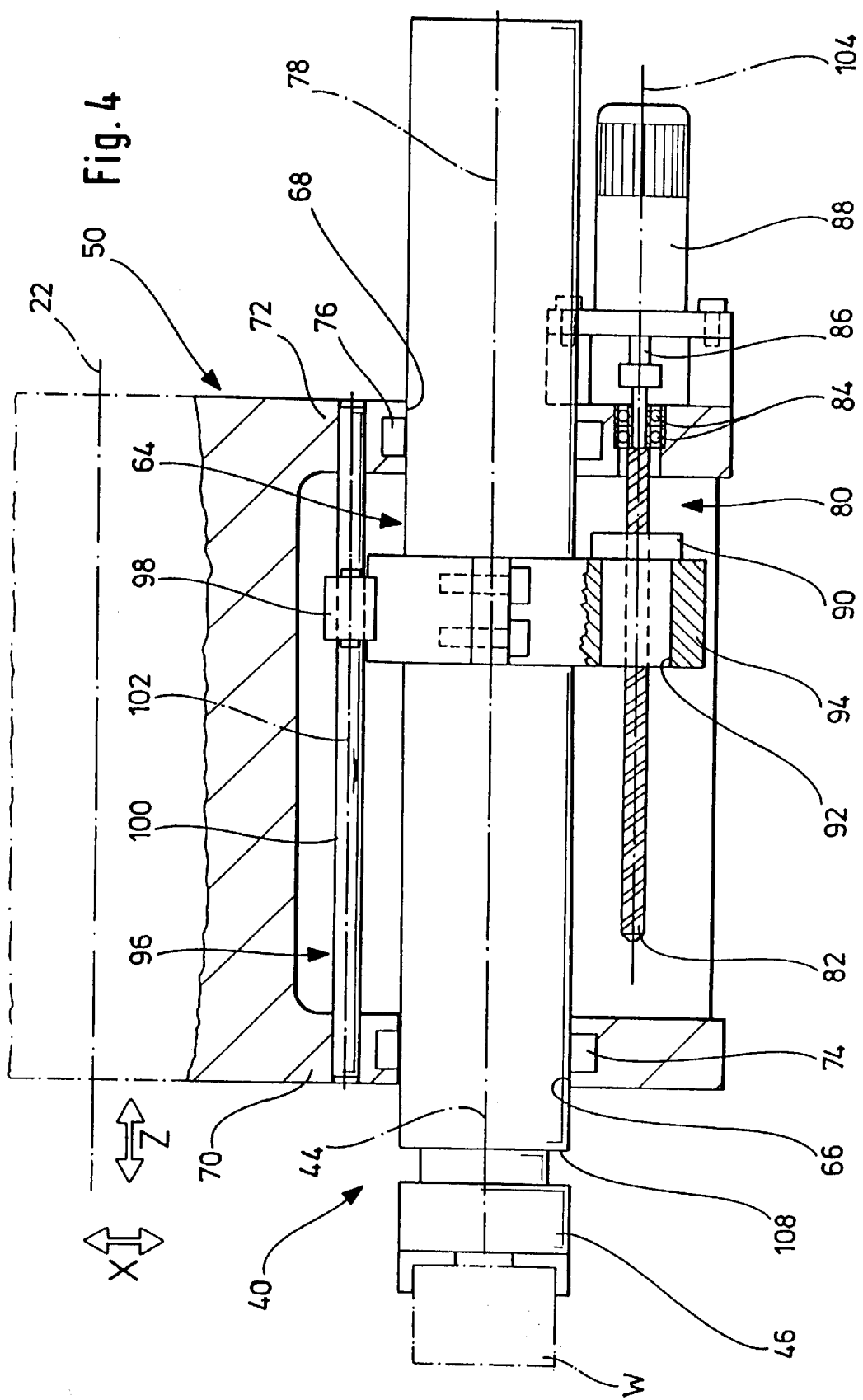
FIG. 4 shows in sections an enlarged sectional illustration through a drum in FIG. 1.

For the defined displacement of the sleeve 64 relative to the drum 20 and/or to the drum 50, a linear drive is provided, which is designated in FIG. 4 as a whole as 80 and comprises a ball screw spindle 82 which extends between the bearing plates 70 and 72, is mounted on the rear bearing plate 72 with an axial and radial bearing 84 and directly connected to a motor shaft 86 of a drive motor 88 which is arranged on a side of the rear bearing plate 72 facing away from the front bearing plate 70 and held on this. The ball screw spindle 82 penetrates, for its part, a ball screw nut 90 which is arranged in a passage 92 of an arm 94 which, for its part, engages around the sleeve 64 at its outer side and is fixed non-displaceably on it. The arm 94 is preferably guided on a side located opposite the linear drive 80 in a longitudinal guide means which is designated as a whole as 96 and has a guide member 98 which, for its part, slides on a guide rod 100, wherein the guide rod 100 extends with its longitudinal axis 102 parallel to the central axis 78 of the sleeve 64 and parallel to the axis of rotation 22 and is held in the front and rear bearing plates 70 and 72 of the counterdrum 50. The longitudinal guide means 96 serves to guide the sleeve 64 on the counterdrum 50 in a non-rotatable manner but for longitudinal displacement in the direction of the central axis 78.

Figure 5:
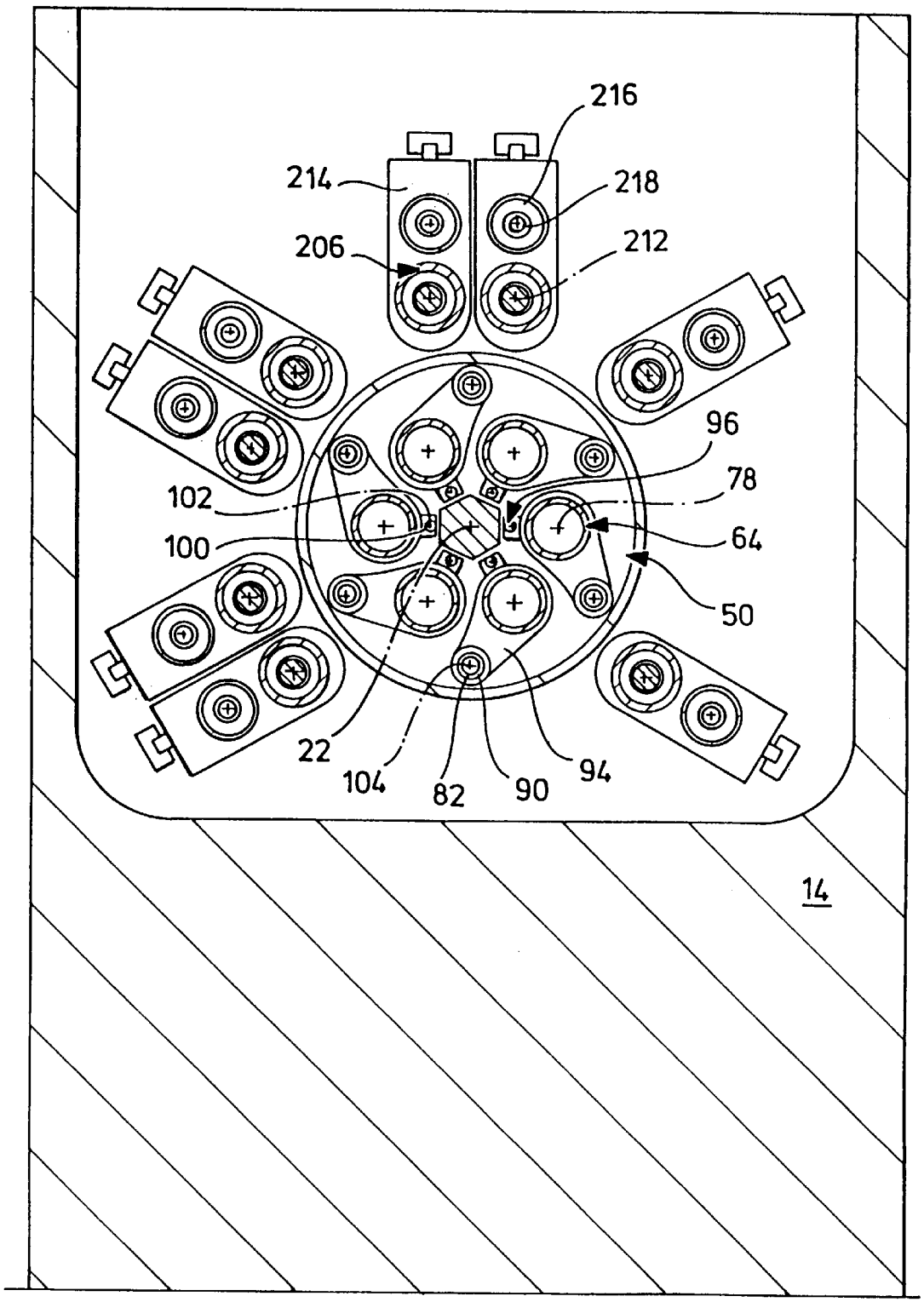
FIG. 5 shows a section along line V—V in FIG. 1.

As illustrated in FIG. 5, the linear drive 80 is preferably arranged such that a longitudinal axis 104 is arranged in an angular region centrally between the central axes 78 of two consecutive sleeves 64, preferably staggered in relation to these two sleeves 64.

The longitudinal guide means 96 is preferably arranged on a side of the respective sleeve 64 facing the axis of rotation 22, as likewise illustrated in FIG. 5.

Figure 6:
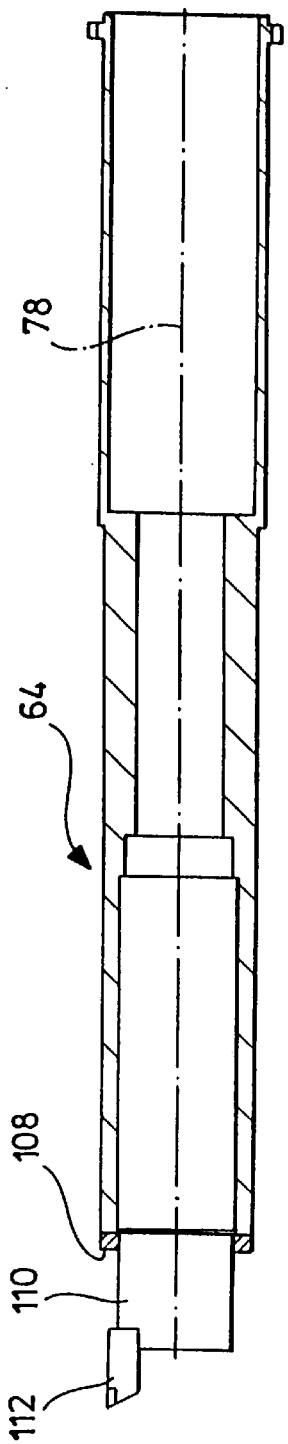
FIG. 6 shows an enlarged illustration of a first embodiment of an inventive machining device.

The machining devices 40 can be designed in the most varied of ways. For example, a simple tool 112 rigidly anchored in a sleeve 64 via a tool holder 110 can—as illustrated in FIG. 6—be arranged in the sleeve 64, this tool being movable due to movement of the sleeve 64 towards the workpiece in the opposite machining device 40 designed, for example, in the form of a workpiece spindle, wherein the rotational position of the tool 112 relative to the central axis 78 is clearly defined by the non-rotatable mounting of the sleeve 64 in the drum 50.

Figure 7:
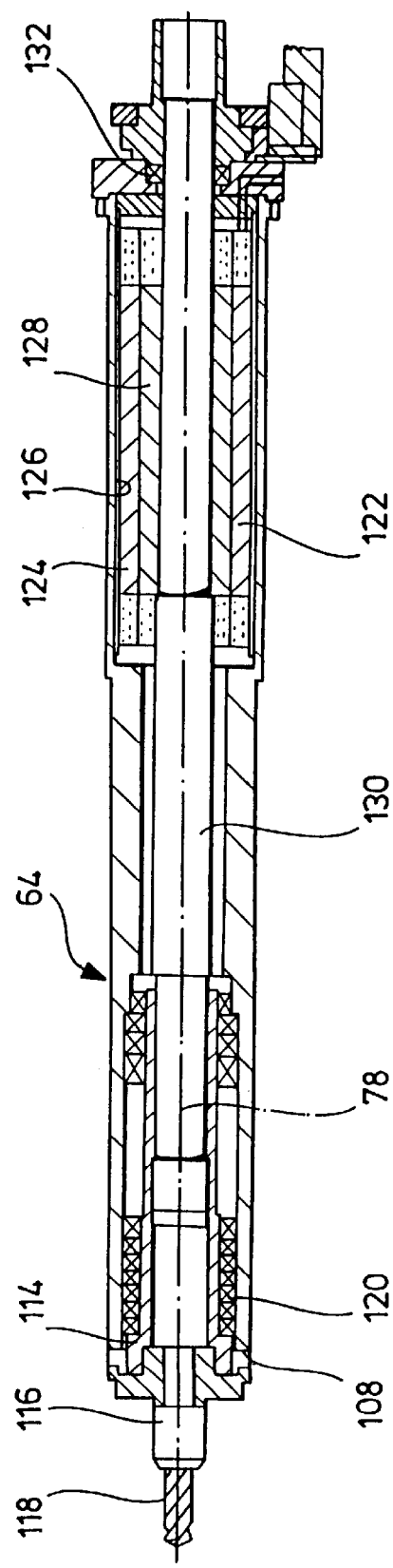
FIG. 7 shows an enlarged illustration of a second embodiment of an inventive machining device.

A second possibility of an inventive machining device, illustrated in FIG. 7, comprises a tool receiving means 114 which is rotatably arranged in the sleeve 64 and into which a holder 116 of a rotating tool 118 can be inserted, wherein the rotating tool 118 is designed, for example, as a milling tool.

This tool receiving means 114 is mounted in the sleeve 64 via a rotary bearing 120 for rotation about the central axis 78 and can be driven by a built-in motor 122 which is accommodated in a region of the sleeve 64 located opposite the tool receiving means 114. In this respect, a stator 124 of the built-in motor is rigidly anchored in an end recess 126 of the sleeve 64 while a rotor 128 is seated on a drive shaft 130 which is rotatably mounted, on the one hand, on one side via the rotary bearing 120 of the tool receiving means 114 and, on the other hand, via an end rotary bearing 132 in the region of the end located opposite the tool receiving means 114. The drive shaft 130 thereby drives the tool receiving means 114 rigidly connected thereto.

By displacing the sleeve 64 along its central axis 78, the rotating tool 118 can, for example, be moved towards the workpiece W held in the opposite machining device 40 designed as a workpiece spindle and, at the same time, this tool 118 can be rotatingly driven by the built-in motor 122.

Figure 8:
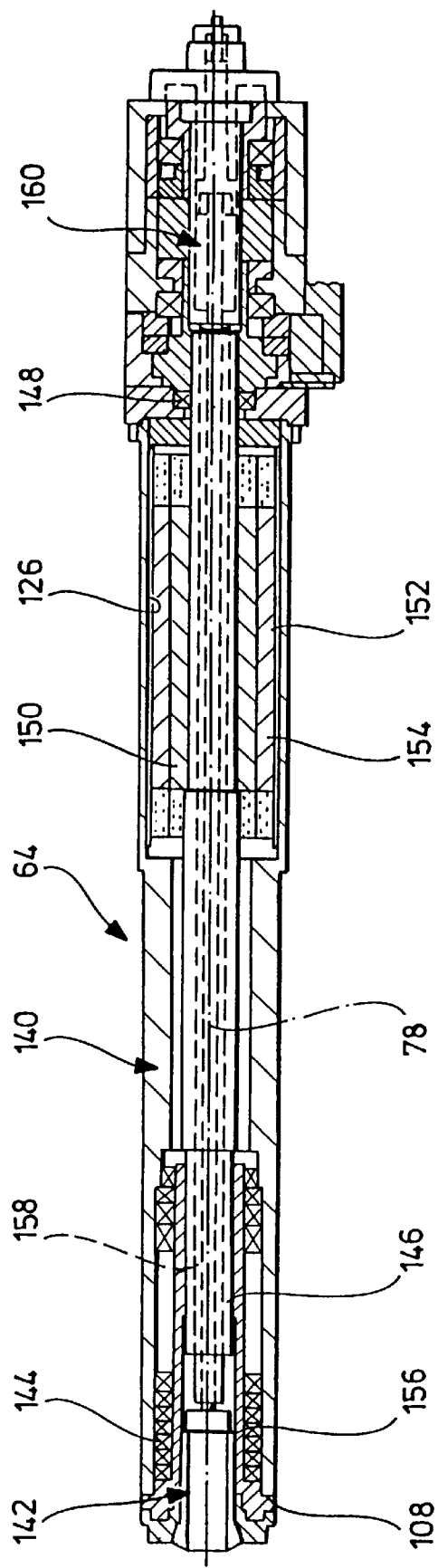
FIG. 8 shows an enlarged illustration of a third embodiment of an inventive machining device.

In a third embodiment of an inventive machining device, illustrated in FIG. 8, a workpiece spindle designated as a whole as 140 is arranged in the sleeve 64. This workpiece spindle 140 comprises a workpiece clamping element which is designated as a whole as 142, is arranged in this sleeve 64 at the front side 108 thereof facing the operating area 18 and is rotatably mounted in the sleeve 64 by means of a rotary bearing 144.

The workpiece clamping element 142 is thereby seated on a spindle tube 146 which penetrates the entire sleeve 64 and on the rear side thereof is likewise rotatably mounted on it via a rotary bearing 148 and is thereby rotatable coaxially to the central axis 78 as axis of rotation. A rotor 150 of a built-in motor designated as a whole as 152 is seated on the spindle tube 146, wherein a stator 154 is securely arranged in the rear recess 126 of the sleeve 64.

In order to actuate, for example, a collet 156 of the workpiece clamping element, a clamping tube 158 leads from this inside the spindle tube 146 to a hydraulic cocking cylinder 160 which is arranged on a side of the sleeve 64 located opposite the workpiece chuck 142 so that the collet 156 can be actuated via the clamping tube 158 in the customary manner by the hydraulic cocking cylinder 160.

The workpiece spindle 140 inserted in the sleeve 64 can be moved towards and away from the workpiece W arranged in the oppositely located machining device, for example a workpiece spindle, on account of movement of the sleeve 64 in the direction of its central axis 78.

In a further embodiment of an inventive machining device, as illustrated in FIG. 9, a guide means 170 for a stock bar 172 is provided in the sleeve 64, wherein the guide means 170 is formed, for example, by a guide bush which extends through the sleeve 64 and in which the stock bar 172 is guided for rotation by means of an oil film 174 and for displacement in the direction of the central axis 78 coaxially to the central axis 78. Such a guide means 170 creates the possibility of carrying out a longitudinal rotary machining in combination with the oppositely located workpiece spindle 46, wherein, in this case, the oppositely located machining device 40 is designed as a workpiece spindle and must be mounted in the spindle support 20 so as to be displaceable in the direction of its spindle axis in the same manner as that described in conjunction with the workpiece spindle 140.

In a further embodiment of an inventive machining device, illustrated in FIG. 10, a tailstock 180 with a tip 182 is provided in the sleeve 64.

In the illustrated embodiment, the machining devices 40 arranged in the positions 42a to f and 62a to f can be positioned in different stations 190a to f and 192a to f stationary in relation to the stands 12 and 14 by rotating the supports 20 or 50. Tool slides 194, on which machining tools 196 are mounted and which are movable in relation to the stands 12, 14 altogether in the direction of the X-axis and Z-axis, are associated on the two stands 12 and 14 with one or more of the stations 190 or one or more of the stations 192, into which the machining devices 40 can be moved, as illustrated in FIGS. 1 and 11.

The tool slide 194 is thereby seated on a slide guide means designated as a whole as 198 and is displaceable on this transversely to the axis of rotation 22 and thus also transversely to the central axes 78 of the sleeves 64, preferably at right angles to them, in the direction of the X-axis. For the defined positioning of the slide 194 this supports a holder 200 for a ball screw nut 202 which is penetrated by a ball screw spindle 204. The ball screw spindle 204 is thereby mounted at its end in the slide guide means 198 so as to be rotatable and axially non-displaceable.

The entire slide guide means 198 is movable in the direction of the Z-axis and for this purpose is seated, for its part, on a Z-sleeve 206 which penetrates the respective stand 12 or 14 and is mounted in guide means 208 and 210 of the respective stand 12 or 14 for displacement in the direction of its central axis 212 parallel to the axis of rotation 22 or to the central axes 78.

In order to displace the Z-sleeve 206, this is engaged by a holder 214 which bears a ball screw nut 216 which is arranged next to the Z-sleeve 206 and, for its part, is penetrated by a ball screw spindle 218, wherein this ball screw spindle 218 extends inside the respective stand 12 or 14 and is aligned parallel to the central axis 212. The ball screw spindle 218 is mounted, for example, at one end by means of a rotary bearing 220 so as to be rotatable in the respective stand 12, 14 and is connected to a drive shaft 222 of a feed motor which is designated as a whole as 224, protrudes on one side of the stand 12 or 14 located opposite the slide guide means 198 and is held thereon.

In order to drive the ball screw spindle 204, the Z-sleeve 206 is also penetrated by a drive shaft 226 which is connected to a motor shaft 228 of a feed motor 230 and extends as far as the ball screw spindle 204. The drive shaft 226 is rotatably mounted at one end of the Z-sleeve 206 in a rotary bearing 232 and is in drive connection with the ball screw spindle 204 via a miter gear 234.

The ball screw spindle 204 can thus be rotated by means of the feed motor 230 and the cross slide 194 thus displaced transversely to the respective spindle axis 44 or central axis 78 while the entire Z-sleeve 206 is displaceable by means of the feed motor 224 parallel to its central axis 212 and thus also parallel to the spindle axes 44 or the central axes 78.

In order to activate the rotary drives 28 and 58 of the tool 196 movable altogether in the direction of the X-axis and Z-axis in the individual stations 190 and 192 as well as the machining devices 40 in the individual positions 42 and 62, a machine control designated as a whole as 240 is provided (FIG. 1).

A connection between the machine control 240 and the machining devices 40 arranged on the drums 20 and/or 50 takes place in the case of each of the drums 20 and/or 50 by means of a supply connection 242 between the machine frame 10 and the respective drum 20 and 50 which is arranged on a side of the respective stand 12 and 14 facing away from the operating area and which comprises a supply line 244 which is guided in a link chain 246, wherein the supply line 244 is arranged at one end 248 so as to be stationary in relation to the machine frame 10 on the rear side of the respective stand 12 and 14 and with another end 250 is securely connected to a tube 252 protruding beyond the respective drum 20 and 50 on the respective side located opposite the operating area 18, wherein the supply line 244 extends helically between the two ends 248 and 250 in a plane 253 extending at right angles to the axis of rotation 22. In addition, the tube 252 is surrounded by a worm housing 254, out of which the supply line 244 is guided through an opening 256.

Figure 12:
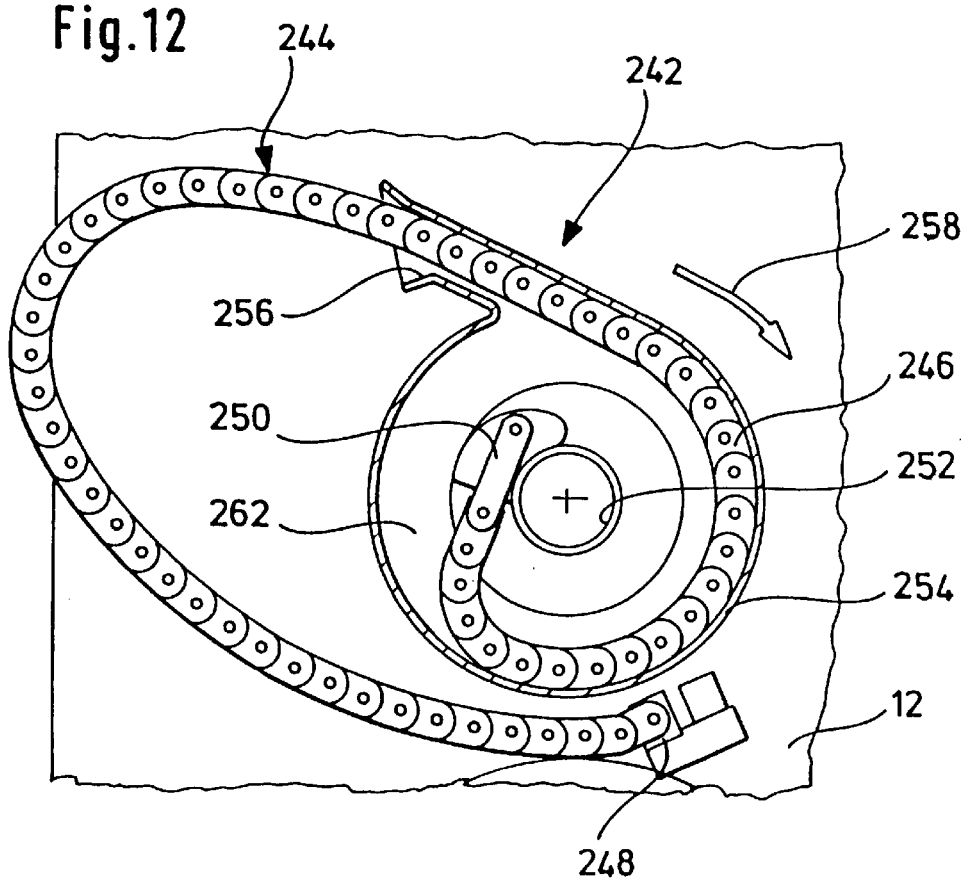
FIG. 12 shows a section along line VII—VII in FIG. 1 in the initial position of the drum.
Figure 13:
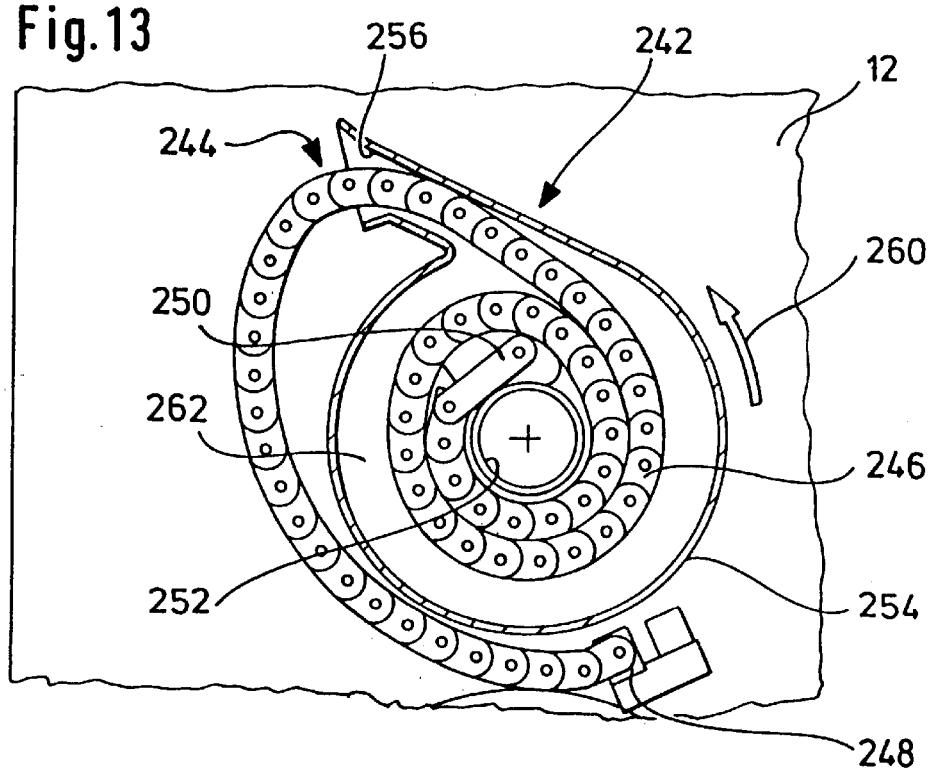
FIG. 13 shows a section similar to FIG. 12 in the end position of the drum.

As illustrated in FIG. 12 and FIG. 13, the respective drum 20 and 50 is rotatable through a maximum angle of, for example, 360-360/(number of stations) degrees, in this embodiment 300 degrees, from an initial position illustrated in FIG. 12 in the direction of arrow 258 into an end position illustrated in FIG. 13, wherein in this end position the supply line 244 has wound itself around the tube 252 in the form of a tight spiral. Furthermore, the respective drum 20 and 50 is rotatable in the opposite direction to arrow 258, i.e. in the direction of arrow 260, from the end position illustrated in FIG. 13 into the initial position illustrated in FIG. 12, wherein the supply line 244 wound in a spiral shape around the tube 252 unwinds and is pushed out from the worm housing 254 through the opening 256.

Guide disks 262, which hold the supply line 244 in the plane 253 extending at right angles to the axis of rotation 22, are preferably provided on both sides of the worm housing 254.

As a result, the respective drum 20 and 50 is rotatable, for example, through the angle of 300 degrees in individual steps such that each of the machining devices 40 in the positions 42 passes through all the stations 190 and 192 for such a time until the end position is reached. Subsequently, a quick rotation back into the initial position takes place without stopping in the individual stations 190 and 192 and proceeding from this position a renewed passage through with stops in the individual stations 190 and 192.

The following machining operations can be carried out with an inventive multiple-spindle lathe with the versions described in detail in the following.

In the simplest version (FIG. 14) of the inventive multiple-spindle lathe, each of the machining units 40 in the drum 20 comprises a workpiece spindle 140, in the workpiece clamping element 142 of which a workpiece W can be clamped.

The second drum 50 located opposite the first drum comprises tools 112 which are arranged in the sleeves 64, face the operating area 18 and are held on tool holders 110.

In the simplest case, it is even possible with this embodiment to design the drum 50 so as not to be rotatable about the axis of rotation 22 by means of the rotary drive 58 but to be securely anchored in the second stand 14.

The workpiece W is now movable in the direction of the tool 112 as a result of movement of the workpiece spindle 140 in the direction of the central axis 78 of the sleeve 64, wherein this movement represents a Z-axis movement for the machining of the workpiece W. The workpiece W is thereby rotatingly driven at the same time by the built-in motor 152 so that a machining of the workpiece W on a side S1 can be carried out as a result of the Z-axis movement between the workpiece W and the tool 112.

Figure 14:
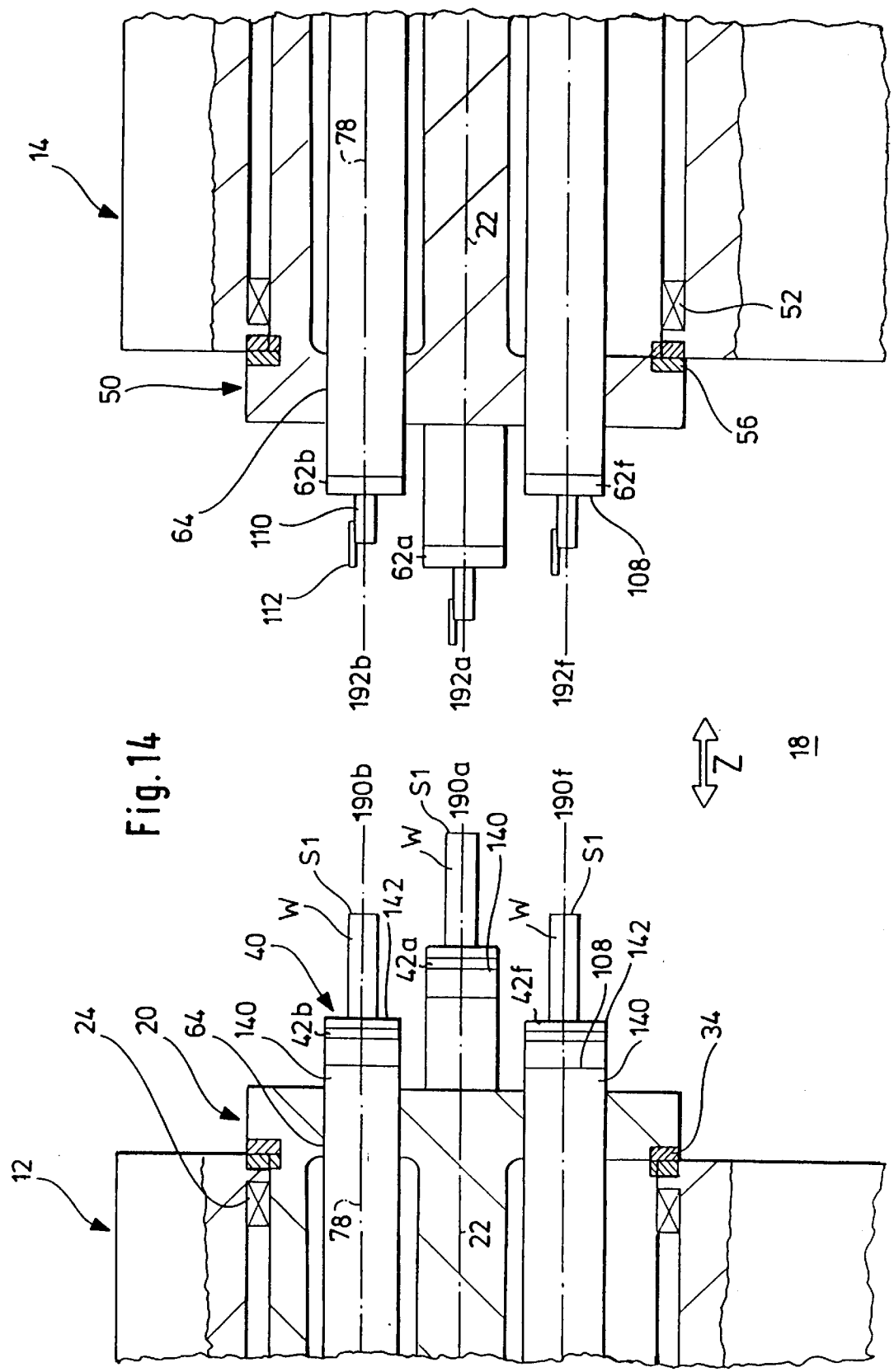
FIG. 14 shows a sectional, schematic illustration of machining of a workpiece in a first version of the multiple-spindle lathe.

Such a machining of the workpiece W takes place, for example as illustrated in FIG. 14, in the station 190a. After machining of the workpiece W in the station 190a has terminated, the drum is indexed further in such a manner that the workpiece W is positioned with the workpiece spindle 140 in the next following station 190b while the workpiece W positioned in the preceding station 190f is positioned in the station 190a with the workpiece spindle 140 holding it and thus undergoes the same machining as a result of a relative movement along the Z-axis by means of the tool 112.

Figure 15:
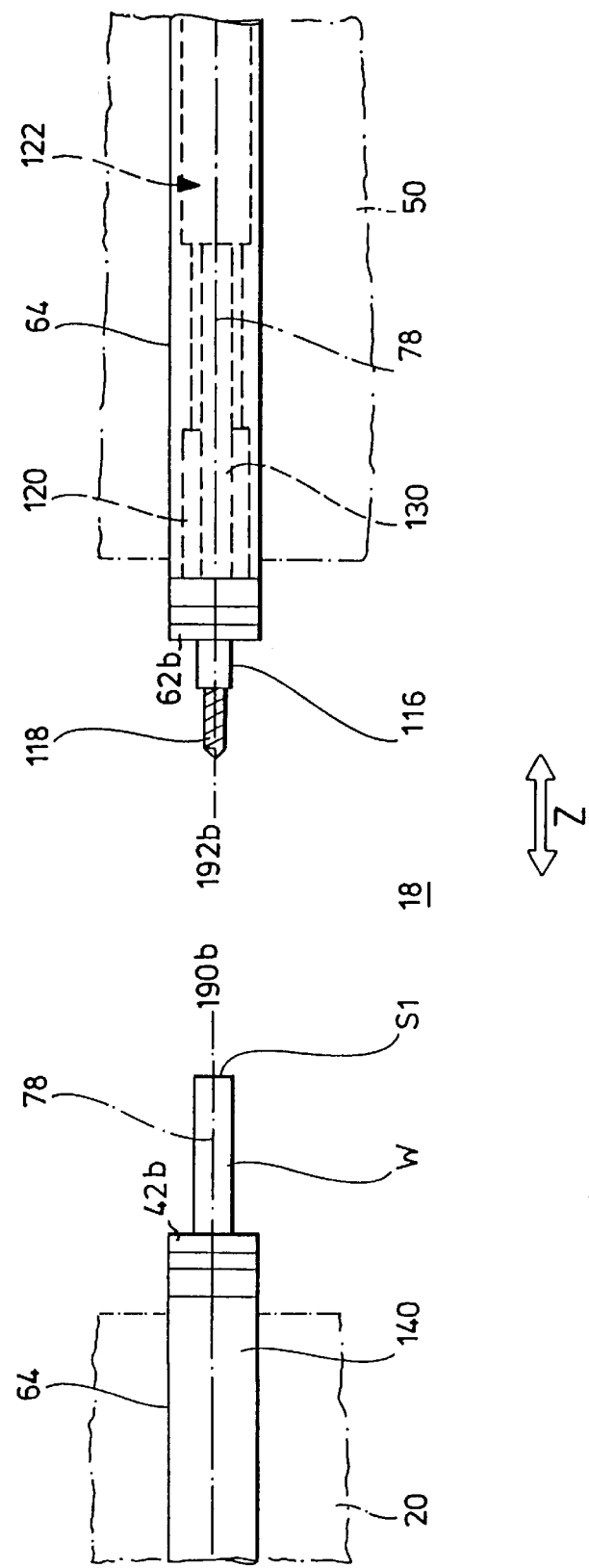
FIG. 15 shows a sectional, schematic illustration of machining of a workpiece in a second version of the multiple-spindle lathe.

Analogously to the machining of the workpiece W by means of the tool 112, it is possible in another version, as illustrated in FIG. 15, for example in the spindle position 190b, to machine the workpiece W by means of the rotating tool 118 which is mounted in position 62b in the machining device 40 designed as a rotatable tool receiving means 120 and is rotatingly driven by the built-in motor 122 in the sleeve 64. In this case, as well, the relative movement between the workpiece W and the tool 118 takes place along the Z-axis as a result of displacement of the workpiece spindle 140 in the sleeve 64 in the manner described in conjunction with FIG. 14. In this spindle station, the next respective workpiece W can likewise be machined as a result of indexing the drum 20 further—in the same way as that described in conjunction with the machining according to FIG. 14.

Figure 16:
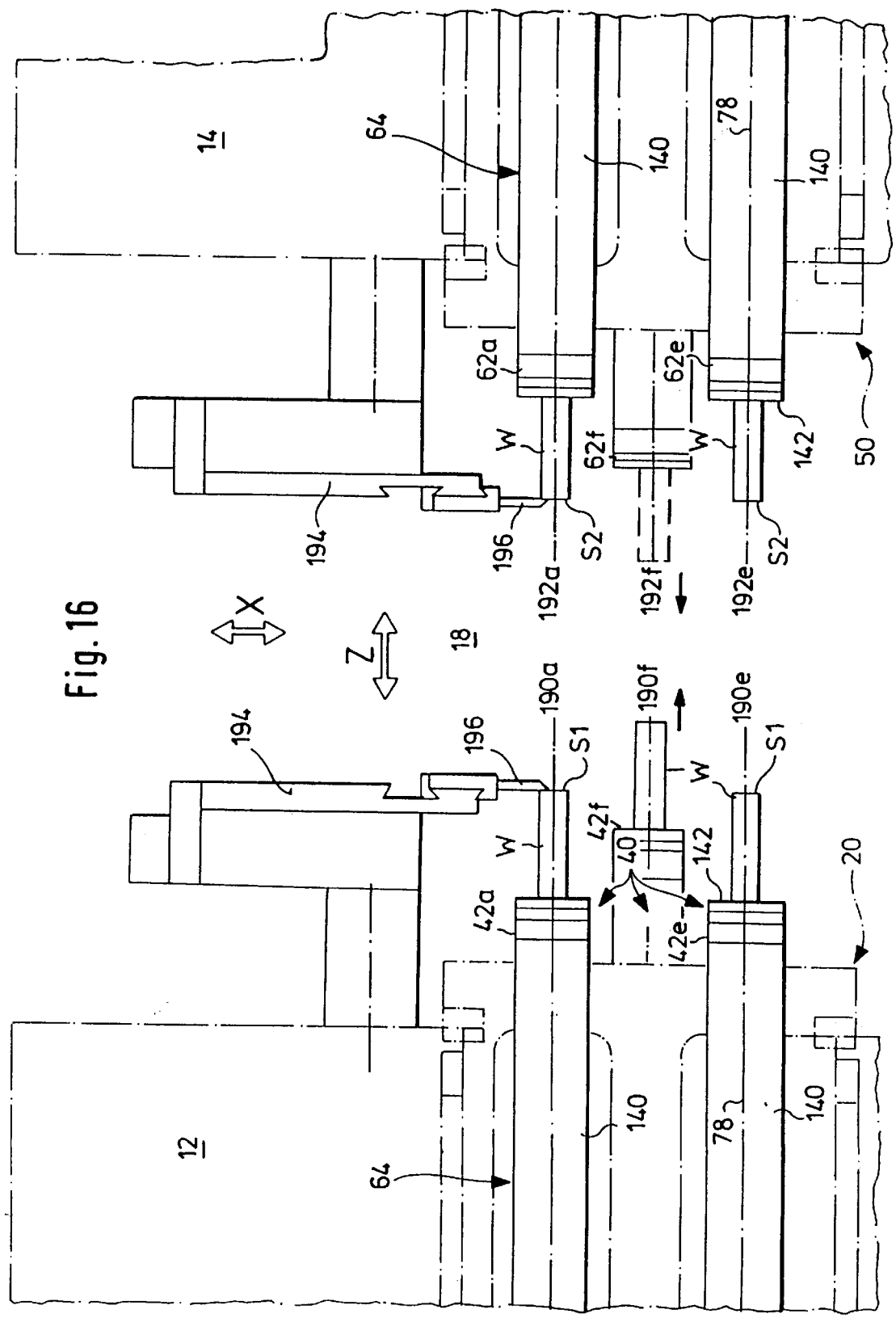
FIG. 16 shows a sectional, schematic illustration of machining of a workpiece in a third version of the multiple-spindle lathe.

In a further version of an inventive multiple-spindle lathe, illustrated in FIG. 16, workpiece spindles 140 are likewise provided in the sleeves 64 in the drum 20 as machining devices 40 while workpiece spindles 140 are also provided in the sleeves 64 in the second drum 50. In this case, the second drum 50 is rotatable about the axis of rotation 22 synchronously with the first drum 20 and the individual machining devices 40 in the individual positions 42a and 62a are arranged coaxially to one another and are clearly associated with one another.

The synchronous rotation of the two drums 20 and 50 takes place as a result of synchronous activation of the two rotary drives 28 and 58 designed as numerically controlled rotational shaft members.

In this embodiment, both workpiece spindles 140 are also preferably movable in the direction of the central axis 78.

With this version, it is now possible to machine the workpieces W, for example, in the stations 190a and 192a by means of the respective tool 196, arranged on a respective, described slide 194, wherein the tools 196 are movable, on the one hand, due to movement of the slides 194 relative to the workpiece W along the X-axis and, on the other hand, the workpieces W are movable relative to the tool 196 in the direction of the Z-axis due to displacement of the corresponding sleeve 64 in the direction of its central axis 78.

In this respect, a machining of the workpiece W in the station 190a takes place, for example, on the side S1 and in the station 192a a machining of the oppositely arranged workpiece W on the side S2, i.e. in each station a machining of one workpiece W on the front side S1 and of the oppositely located workpiece W on the rear side S2.

With such a version it is possible, in addition, for example in the stations 190f and 192f, to carry out a transfer of the workpiece W from the workpiece spindle 140 in the position 42f to the workpiece spindle 140 in the position 62f by moving the workpiece spindles 140 towards one another in the direction of their central axes 78 and by transferring the workpiece W from the workpiece clamping element 142 in the position 42f to the workpiece clamping element 142 in the position 62f so that, for example, in the stations 190a to 190e a machining of the front side S1 of the workpiece W takes place, in the station 190f a transfer of the workpiece W from the workpiece spindle 140 in the position 42f to the workpiece spindle 140 in the position 62f in the station 192f and, proceeding therefrom, in the stations 192a to 192e a machining of the rear side S2 of the workpiece W takes place.

Figure 17:
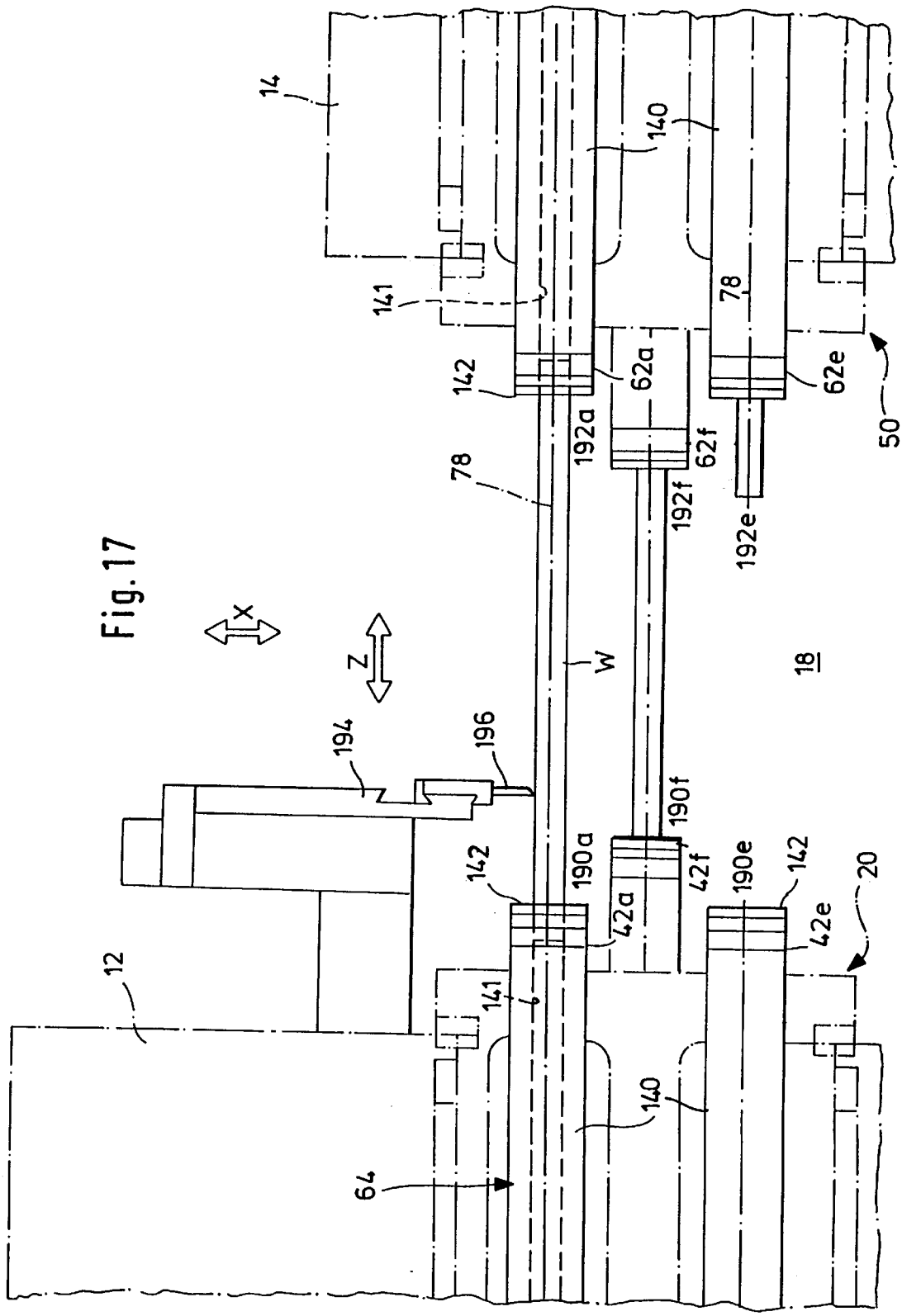
FIG. 17 shows a sectional, schematic illustration of machining of a workpiece in a fourth version of the multiple-spindle lathe.

In a further version of an inventive multiple-spindle lathe, illustrated in FIG. 17, each machining device designed as a workpiece spindle 140 in the positions 42 has associated with it a machining device likewise designed as a workpiece spindle 140 in the positions 62, wherein the drums 20 and 50 are likewise rotatable synchronously to one another.

With this version, it is provided for a workpiece W to be clamped by both workpiece clamping elements 142 of both workpiece spindles 140 and for the diameter of the workpiece W to be turned in the manner of a shaft turning operation over the entire length between the two workpiece clamping elements 142 by means of a tool 196. Such a shaft turning operation takes place, for example, in the stations 190a and 192a located opposite one another while, for example, in the remaining stations 190b to f and 192b to f an additional shaft machining operation is likewise possible (e.g. in the stations 190f and 192f) or a machining of the end of the workpiece W (e.g. in the stations 190e and 192e), wherein, in this case, the workpiece spindles 140 are respectively designed such that the workpiece W can be pushed through a central guide channel 141 in the respective workpiece spindle 140.

During the machining of the workpiece W at its end, a Z-axis movement takes place, as already described, for example, in conjunction with FIG. 16, due to displacement of the respective workpiece spindle 140 relative to the tool 196.

In addition, a displacement of the workpiece spindles 140 in the direction of the central axis 78 is necessary either in order to clamp the workpiece W on both sides or to push the workpiece W into the respective guide channel 141 to such an extent that a machining of its end side is possible.

Figure 18:
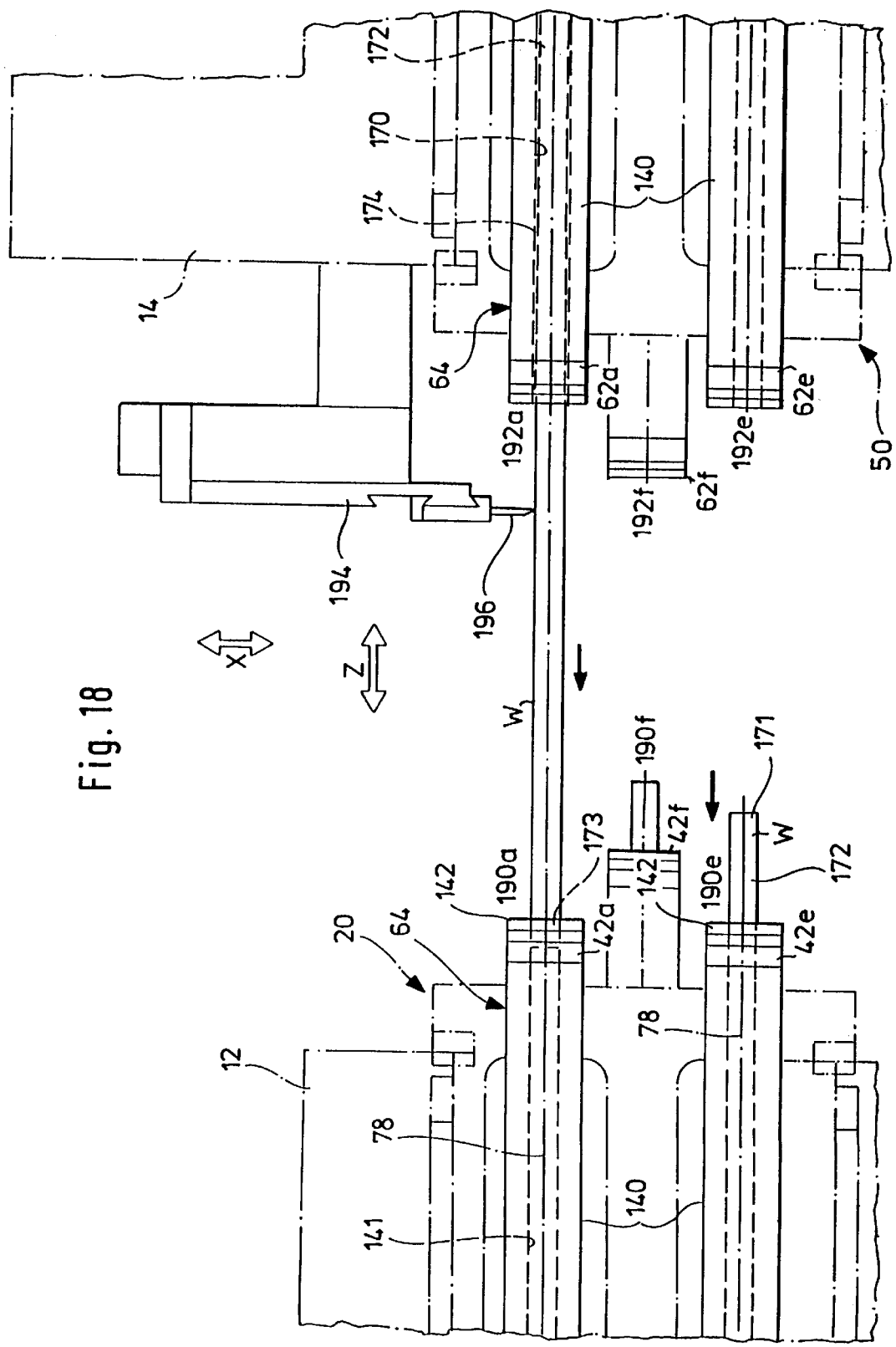
FIG. 18 shows a sectional, schematic illustration of the machining of a workpiece in a fifth version of the multiple-spindle lathe

In a further version, illustrated in FIG. 18, a workpiece spindle 140, which is displaceable along its central axis 78, is provided in each position 42 of the drum 20. A guide means 170 described in conjunction with FIG. 9 is associated with each workpiece spindle 140 in each position 62 of the drum 50, wherein a stock bar 172, which projects beyond the guide means 170 into the operating area 18, may be supplied each time through this guide means 170.

The stock bar 172 can be gripped at an end 173 by the workpiece clamping element 142 of the workpiece spindle 140 and withdrawn out of the guide means 170 in the direction of the Z-axis. In this respect, the tool 196 is arranged on a slide 194, this tool being non-displaceable in the direction of the Z-axis near to the guide means 170 in the operating area 18 and only movable in the direction of the X-axis, i.e. at right angles to the central axis 78. Longitudinal turning is possible with this tool 196 in that the spindle 140, on the one hand, rotatingly drives the stock bar clamped at the end 173 and, on the other hand, constantly withdraws it out of the guide means 170, wherein the feed movement in Z-direction results from this so that the machined workpiece W can be produced in accordance with the principle of Swiss-type longitudinal turning.

For example, such a longitudinal turning operating is possible in a portion of the oppositely located spindle stations 190a to f and 192a to f while in another portion of the spindle stations cutting off and, where applicable, machining of an end side takes place (e.g. in the stations 190e and 192e), wherein, in this case as well, the workpiece spindle 140 is preferably provided with the central guide channel 141 so that the workpiece W machined as part of the longitudinal turning can be pushed through the workpiece spindle 140 coaxially to its central axis 78.

Such a Swiss-type longitudinal turning of the workpiece W is, however, also possible when, instead of the guide means 170, a workpiece spindle 140 is used, the workpiece clamping element 142 of which serves during Swiss-type longitudinal turning merely as a guide means for the stock bar 172 so that the stock bar can be withdrawn in the manner described out of the workpiece spindle 140 in the positions 62 by means of the respectively other workpiece spindle 140, for example the workpiece spindle 140 in the positions 42, and thus the workpiece spindle 140 in the positions 62 is operative in the same manner for the Swiss-type longitudinal turning.

However, the workpiece spindle 140 in the positions 62 can serve, in addition, to carry out in other stations 190 and 192 an end-side machining operation, on the one hand, of the stock bar pushed through these in the region of its end 173 and, on the other hand, of the opposite end 171, which has resulted due to cutting off of the workpiece W from the stock bar 172 by means of one of the workpiece spindles 140 in the positions 42.

Figure 19:
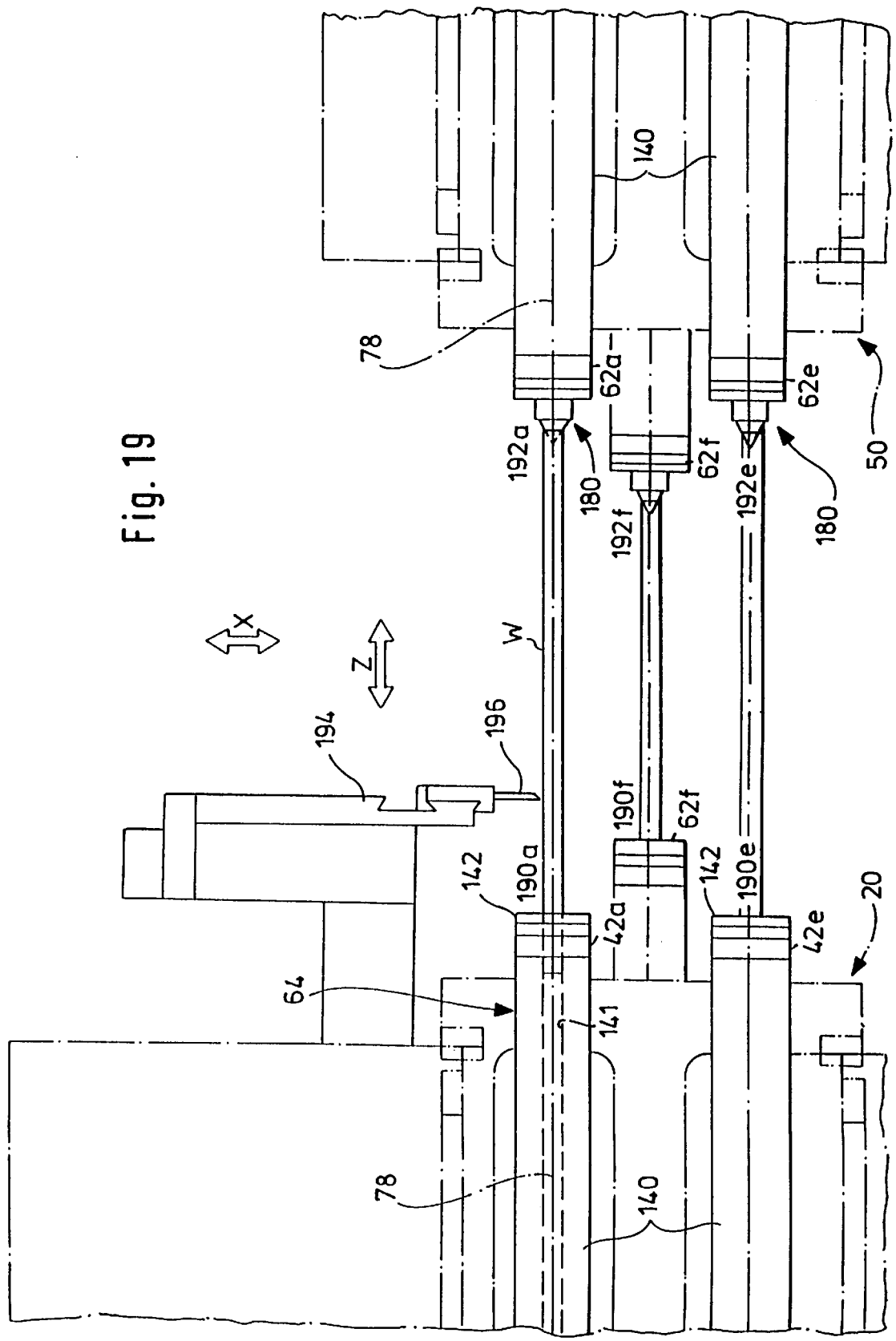
FIG. 19 shows a schematic, sectional illustration of machining of a workpiece in a sixth version of the multiple-spindle lathe.

In a further version, illustrated in FIG. 19, a workpiece spindle 140, which is displaceable in the direction of the central axis 78, is provided, as in the preceding versions, in each of the positions 42 and a tailstock 180 opposite this in the opposite positions 62, wherein the sleeve 64 supporting the tailstock 180 is also preferably displaceable in the direction of its central axis 78.

As a result, a longitudinal turning of the workpiece W is possible by this being clamped, on the one hand, in the workpiece clamping element 142 of the workpiece spindle 140 and, on the other hand, in the tailstock 80, wherein a feed movement in Z-direction takes place as a result of synchronous displacement of the two sleeves 64 in the positions 42 and 62 which are associated with one another. Such a longitudinal turning is possible in one of the oppositely located spindle stations 190a to 190f and 192a to 192f or also only in a portion of them.

The drums 20 and 50 are, in this case, rotatable about the axis of rotation 22 synchronously with one another so that the workpiece W may be brought from a respective pair of opposite stations 190a and 192a into a next pair of opposite stations 190b and 192b by indexing the drums 20 and 50 in order to carry out further machining with the next respective stations.

Figure 20:
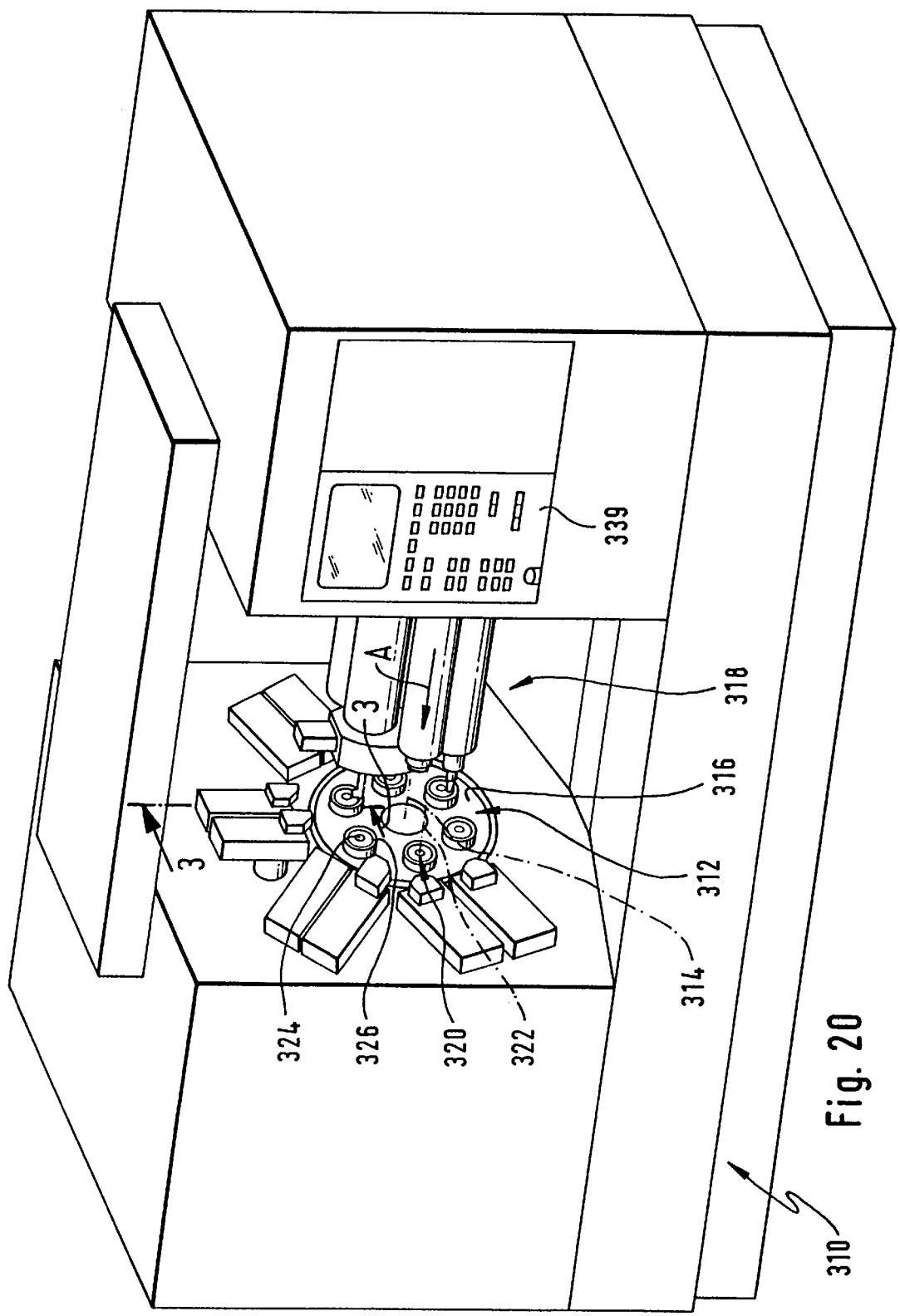
FIG. 20 shows a perspective illustration of a sixth embodiment of an inventive lathe.

A sixth embodiment of an inventive multiple-spindle lathe, illustrated in FIG. 20, has a machine frame which is designated as a whole as 310 and on which a spindle drum designated as a whole as 312 is mounted for rotation about a drum axis 314.

The spindle drum 312 is arranged to face an operating area designated as a whole as 318 with an end face 316 and supports workpiece spindles 320 arranged at the same radial distance from the drum axis 314 and at the same angular distances around this, the spindle axes 322 of these workpiece spindles extending parallel to the drum axis 314. The workpiece spindles 320 likewise face the operating area 318 with their end face 324 and preferably support a workpiece clamping element for clamping a workpiece on their end face.

Figure 21:
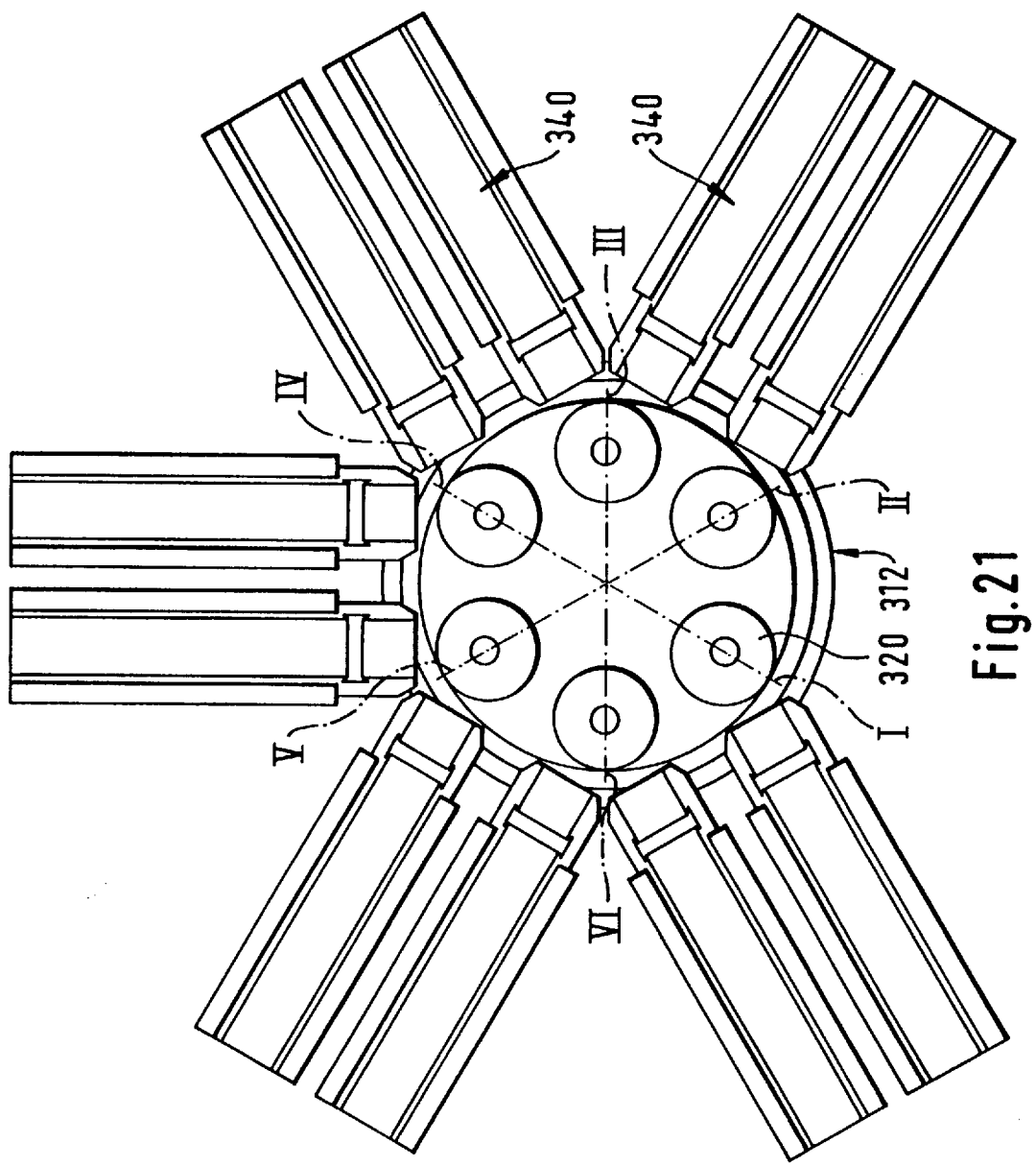
FIG. 21 shows a plan view of a spindle drum of the embodiment according to FIG. 20 in the direction of arrow A in FIG. 20.

The spindle drum 312 is, as illustrated in FIG. 21, rotatable such that its workpiece spindles 320 can be positioned in different spindle stations I to VI. In these spindle stations I to VI, a machining of a workpiece 330 illustrated, for example, in FIG. 22 takes place by means of one or more tools 332 which are accommodated in tool holders 334. For the machining of the workpieces 330, the tools 332 are movable in a controlled manner at least in X-direction by means of a machine control 339 illustrated in FIG. 20, preferably a controlled movement of the tools 332 in Z-direction takes place, in addition.

Figure 22:
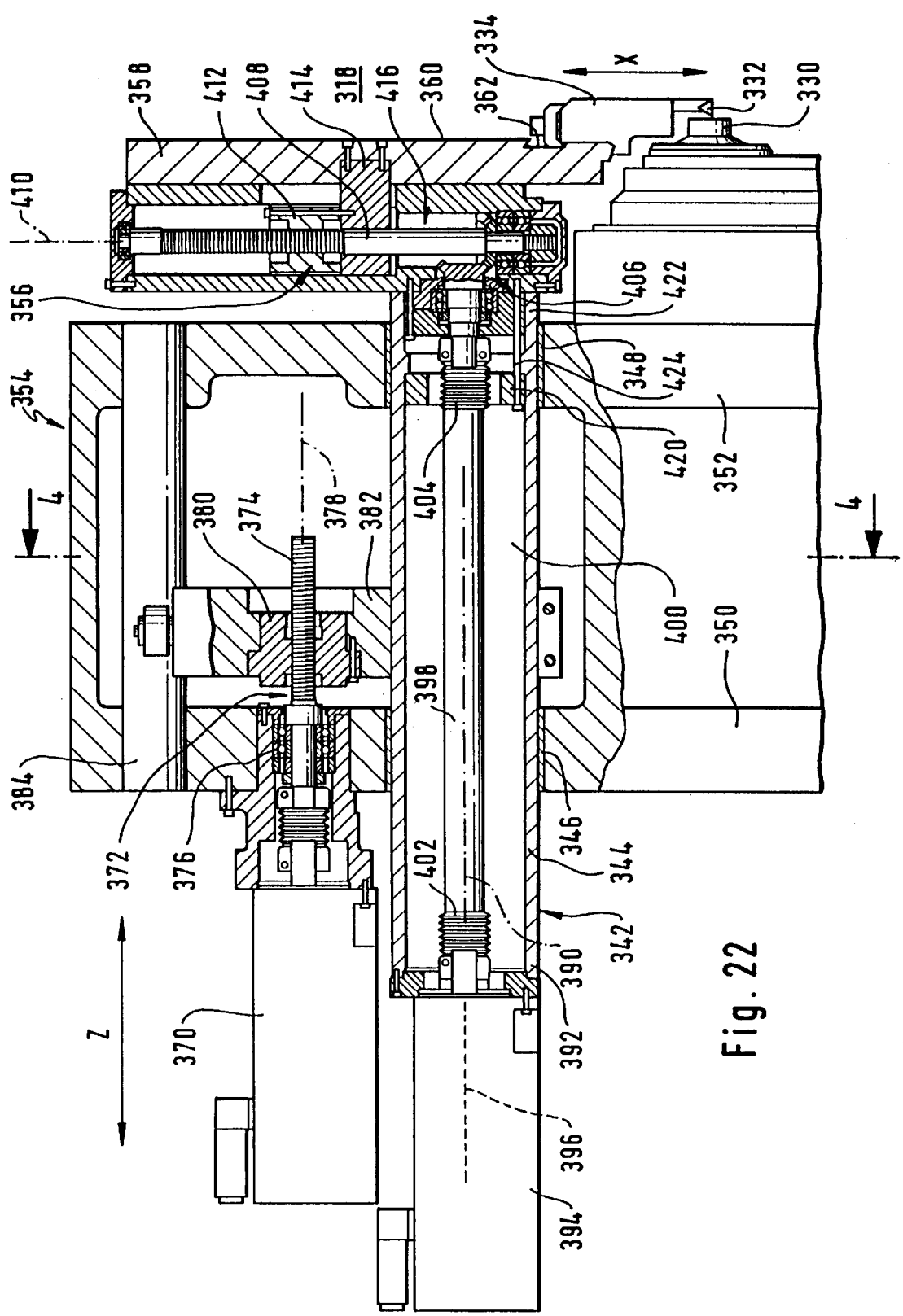
FIG. 22 shows a section along line 3—3 in FIG. 20.

In order to be able to carry out as many machining operations as possible in the individual spindle stations III to VI with as many different tools as possible, the spindle stations III to VI have associated with them two compound slides 340 which are arranged on the side of the operating area 318, on which the spindle drum 312 is also arranged. Each of these compound slides 340 comprises, as illustrated in FIG. 22, a longitudinal slide element 342 which is designed in the form of a sleeve and is mounted with a housing tube 344 in two linear guide means 346 and 348, which are arranged at a distance from one another, form altogether a longitudinal guide means in Z-direction and are arranged in two bearing plates 350 and 352 of a slide stand 354 arranged at a distance from one another.

The longitudinal guide element 342 designed as a sleeve supports on its side facing the operating area 318 a cross slide guide means 356, on which a cross slide 358 is arranged for displacement in X-direction. The cross slide 358 bears on its upper side 360 facing the operating area a receiving means 362 for the tool holder 334.

The cross slide guide means 356 bearing the cross slide 358 is displaceable in Z-direction together with the longitudinal guide element 342 so that a displacement of the tool 332 in Z-direction is also possible as a result.

This displacement can be brought about either by way of a defined positioning of the longitudinal guide element 342 in Z-direction and fixing of this position relative to the slide stand 354 or in a controlled manner by means of a longitudinal feed motor 370 which is activated by the machine control 339, is arranged on a side of the slide stand 354 facing away from the operating area 318 and drives a longitudinal feed gear 372.

The longitudinal feed gear 372 is arranged next to the longitudinal slide element 342 and between the bearing plates 350 and 352 and comprises a feed screw spindle 374 which extends parallel to the housing tube 344 of the longitudinal slide element 342 and is mounted on the slide stand 354 by means of an axial bearing 376 seated on the bearing plate 350 so as to be rotatable but non-displaceable along its axis 378.

Figure 23:
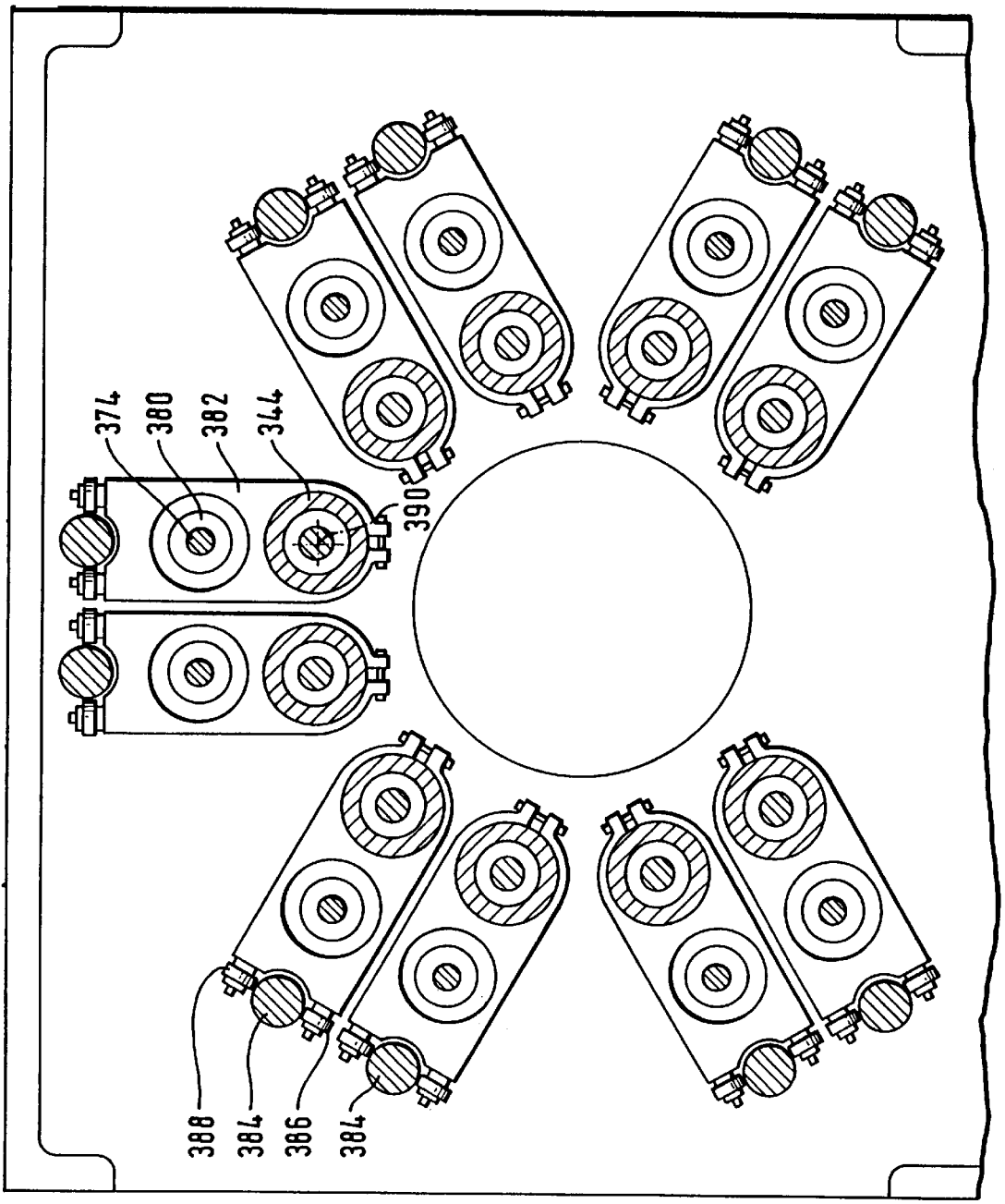
FIG. 23 shows a section along line 4—4 in FIG. 22.
Figure 26:
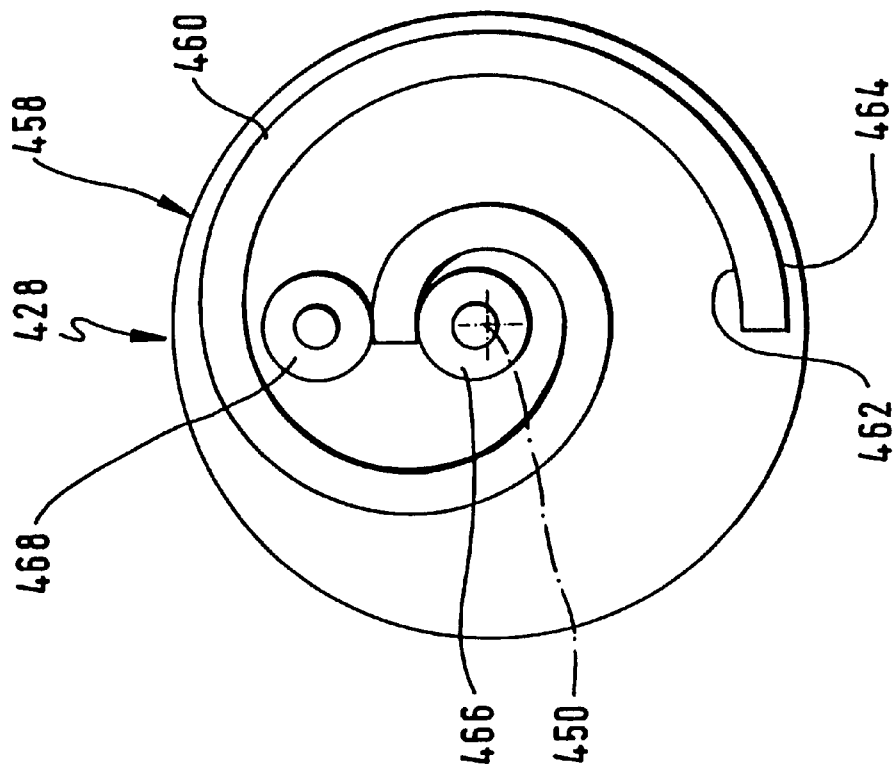
FIG. 26 shows a schematic illustration of a second variation of a lifting cam and FIG. 27 shows a sectional illustration similar to FIG. 22 of a tool slide located opposite a workpiece spindle for the sixth and seventh embodiments.

A spindle nut 380 penetrated by the feed screw spindle 374 is displaceable by this in Z-direction. The spindle nut 380 is thereby seated, as illustrated in FIG. 22 and FIG. 23, in a holding arm 382 which engages in a clamping manner around the housing tube 344 of the longitudinal slide element 342 and extends transversely to this and accommodates the spindle nut 380 in a receiving means. The holding arm 382 also extends, proceeding from the housing tube 344, beyond the spindle nut 380 as far as a guide bar 384 which extends parallel to the Z-direction between the bearing plates 350 and 352 and is held securely on the slide stand 354. The holding arm 382 slides with guide elements, preferably guide rollers 386 and 388 abutting on both sides of the guide bar 384, on this bar. The guide bar 384 and the guide rollers 386 and 388 represent, together with the holding arm 382, a means of securing the longitudinal slide element 342 against rotations about its longitudinal axis 390.

As a result of rotation of the feed screw spindle 374 and the displacement of the spindle nut 380 in Z-direction connected thereto, a movement of the longitudinal slide element 342 in Z-direction, controllable by the machine control 339, is thus possible.

For driving the cross slide 358, a cross feed motor 394 is, as likewise illustrated in FIG. 22, arranged at an end 392 of the longitudinal slide element 342 facing away from the operating area 318. The motor shaft 396 of this cross feed motor extends parallel to the longitudinal axis 390 of the longitudinal slide element 342 and is preferably arranged coaxially to the axis 390. The cross feed motor 394 drives a drive shaft 398 which penetrates an inner cavity 400 of the housing tube 344 of the longitudinal slide element 342 approximately coaxially to the longitudinal axis 390 and is preferably provided with two joints 402 and 404 arranged at a distance from one another.

The drive shaft 398 drives a miter gear which is designated as a whole as 406 and, for its part, drives a cross feed screw spindle 408 which is arranged in the cross slide guide means 356 and is mounted at its end in the cross slide guide means 356 so as to be rotatable and non-displaceable along its spindle axis 410. The cross feed screw spindle 408 thereby penetrates, for its part, a spindle nut 412 which is securely connected to the cross slide 358 via a spindle nut holder 414 so that as a result of rotation of the cross feed screw spindle 408 via the miter gear 406 as well as the drive shaft 398 by means of the cross feed motor 394 the cross slide 358 can be controlled by the machine control 339, which activates the cross feed motor 394, in accordance with the displacement of the spindle nut 412 in X-direction. The cross feed motor 394 thus drives via the drive shaft 398 a cross feed gear, comprising the miter gear 406, which is designated as a whole as 416 and is, for example, arranged as a bevel gear, and the respective cross feed spindle 408 mounted at the end with the spindle nut 412 seated on it.

A connection of the cross slide guide means 356 with the housing tube 344 of the longitudinal guide element 342 is preferably brought about by means of an annular flange 420 which projects radially inwards in an end 422 of the housing tube 344 facing the operating area 318 and is penetrated by anchoring elements 424, for example screws, which are likewise anchored in the cross slide guide means 356 and thus fix the cross slide guide means 356 in position at the end 422 of the housing tube 344.

In a seventh embodiment of an inventive solution, illustrated in FIG. 24, those parts which are identical to those of the sixth embodiment have been given the same reference numerals.

In contrast to the sixth embodiment, a cross feed gear 426 driven by the drive shaft 398 is provided which has a lifting cam 428 driven by the drive shaft 398 which acts on a cam follower 430 with two cam follower elements 446, 448 securely connected to the cross slide 358.

Figure 25:
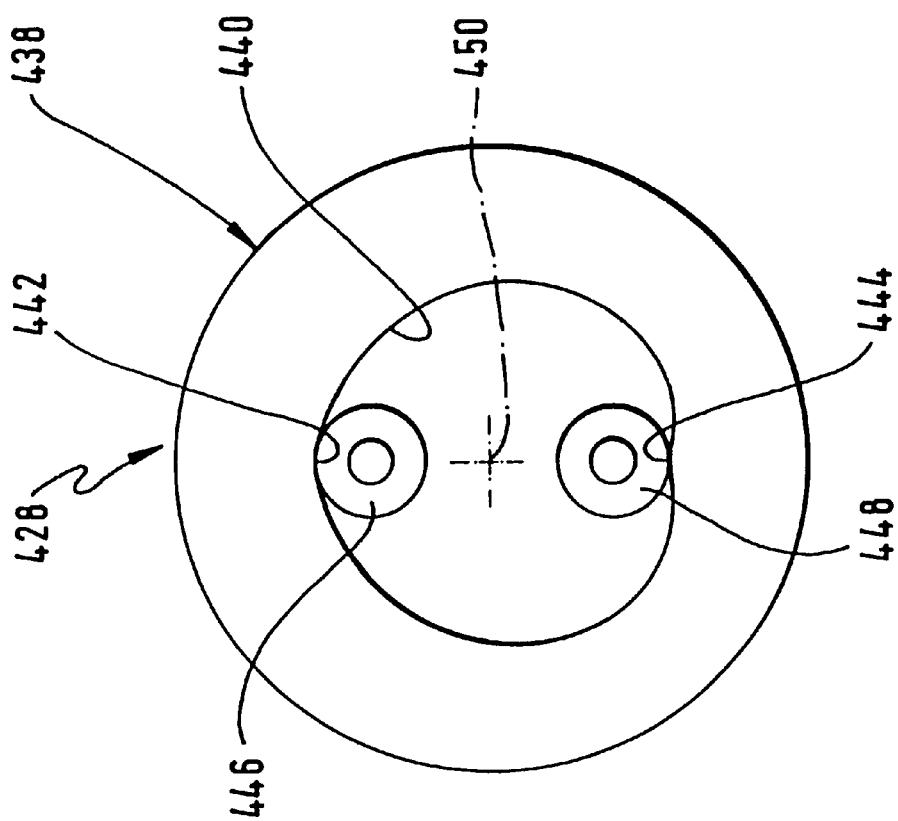
FIG. 25 shows a schematic illustration of a first variation of a lifting cam.
Figure 27:
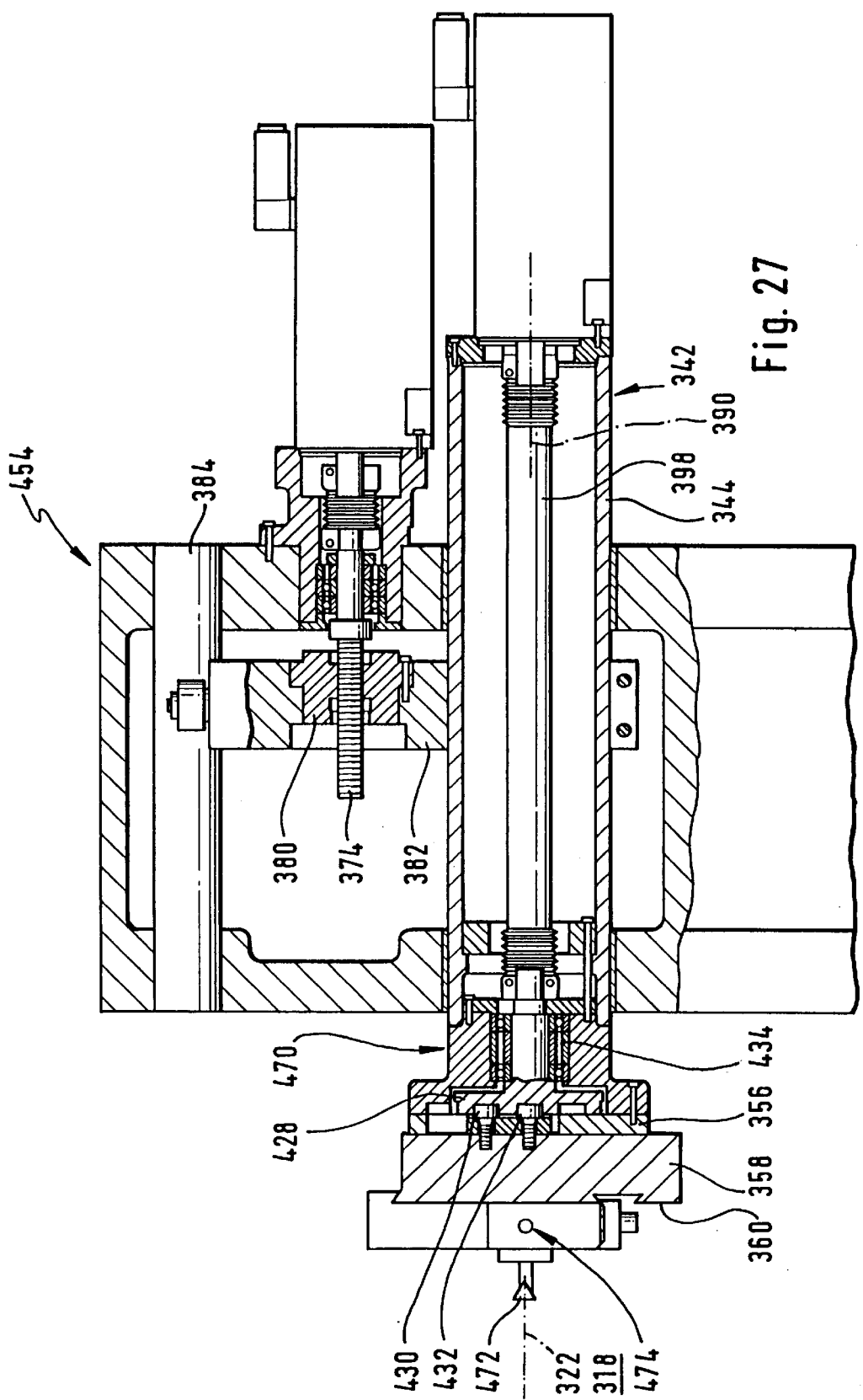

The lifting cam 428 is rotatably mounted by means of a rotary bearing 434 on the end 422 of the housing tube 344 of the longitudinal guide element 342 facing the operating area 318 and, as illustrated in FIG. 25, is designed in a first variation as a hollow cam 438 with an inner lifting surface 440 which acts with respective, oppositely located lifting surface regions 442 and 444 on two cam follower members 446 and 448, constructed, for example, as rollers, and which thus clearly determines their position in X-direction in accordance with the rotational position of the lifting cam 428. For this purpose, the lifting surface 440 is preferably designed such that the lifting surface regions 442, 444 located opposite one another always have the same distance from one another but thereby position the cam follower elements 446 and 448 at different radial distances from an axis of rotation 450 of the lifting cam 128.

In a second variation of the seventh embodiment 458 of the lifting cam 428, the lifting cam 428 itself is designed as a spiral bead 460 and has two lifting surfaces 462 and 464 which are located opposite one another and on which two cam follower elements 466 and 468, respectively, constantly abut. As a result of rotation of the spiral lifting cam 460 about the axis of rotation 450, a positioning of the cam follower elements 466 and 468 is possible at different radial distances from the axis of rotation 450, wherein the cam follower elements 466 and 468 connected to the cross slide 358 clearly position the cross slide 358 in X-direction.

In the case of the compound slides 340, 340' described thus far, which are arranged on the side of the operating area 318, on which the spindle drum 312 is also arranged, these are predominantly compound slides 340, 340' for the controlled movement of tools 332 for machining the outside of workpieces.

In order to be able to work, in addition, not only with the first but also the second embodiment with a third tool 472, preferably a tool for machining the inside of a workpiece, a slide stand 454, in which a compound slide 170 is mounted in the same manner as the compound slide 340 in the slide stand 354, is arranged on a side of the operating area 318 located opposite the slide stand 354.

The only difference is to be seen in the fact that the longitudinal axis 390 of the longitudinal slide element 342 is arranged such that it is approximately aligned with the spindle axis 322 of the workpiece spindle 320 located in the respective spindle station I to VI, in which machining of the inside of a workpiece is intended to take place.

Furthermore, the tool 472 is, in this case, seated with its tool holder 474 on the front side 360 of the cross slide 358 facing the operating area 318 so that the tool 472 can be used approximately in an area around the respective spindle axis 322.

As for the rest, the drive of the cross slide 358 is realized in the same way as in the case of one of the variations of the seventh embodiment of the compound slide 340' described above, wherein the use of the lifting cam 428 has the advantage that the cross slide guide means 356 requires little constructional space transversely to the axis 390.

As for the rest, the same elements have been given the same reference numerals as in the embodiments described above and so in this respect reference is made in full to the preceding explanations.

What is claimed is:

1. A lathe, comprising:
   at least one workpiece spindle arranged on a machine frame and rotatable about a spindle axis,
   said workpiece spindle projecting with its front end into an operating area,
   a tool slide comprising (a) a longitudinal slide element guided for displacement in a Z-direction in a longitudinal guide means that is located outside the operating area and arranged on a slide stand of the machine frame, said Z-direction being parallel to said spindle axis, and (b) a cross slide arranged in the operating area and displaceable in relation to the longitudinal slide element in an X-direction that is transverse to the spindle axis,
   said cross slide being guided on a cross slide guide means arranged at a front end of the longitudinal slide element and movable by means of a cross feed gear, wherein:
   the longitudinal slide element bears a cross feed motor for the cross feed gear in an area located outside the operating area, and
   said cross feed motor drives the cross feed gear by means of a rotary transmission element that extends in a longitudinal direction of the longitudinal slide element.

2. A lathe as defined in claim 1, characterized in that the rotary transmission element penetrates an interior of the longitudinal slide element.

3. A lathe as defined in claim 1, characterized in that the longitudinal slide element extends in said Z-direction away from the operating area beyond the longitudinal guide means and bears the cross feed motor on a side of the longitudinal guide means facing away from the operating area.

4. A lathe as defined in claim 3, characterized in that the cross feed motor is arranged on an end region of the longitudinal slide element facing away from the operating area.

5. A lathe as defined in claim 4, characterized in that the cross feed motor is arranged on an end face of the longitudinal slide element facing away from the operating area.

6. A lathe as defined in claim 5, characterized in that a motor housing of the cross feed motor is arranged approximately in alignment with the longitudinal slide element.

7. A lathe as defined in claim 1, characterized in that the longitudinal slide element penetrates the slide stand of the machine frame bearing the longitudinal guide means and that the cross feed motor is arranged on a side of the slide stand facing away from the operating area.

8. A lathe as defined in claim 1, characterized in that the cross feed motor is arranged with its motor shaft approximately parallel to the longitudinal direction of the longitudinal slide element.

9. A lathe as defined in claim 1, characterized in that the longitudinal slide element is of a tube-like or column-like design.

10. A lathe as defined in claim 1, characterized in that the slide stand bears the at least one workpiece spindle.

11. A lathe as defined in claim 1, characterized in that the slide stand is arranged on a side of the operating area located opposite the at least one workpiece spindle.

12. A lathe as defined in claim 1, characterized in that the cross feed gear has a feed screw spindle extending in X-direction as well as arranged on the cross slide guide means and a spindle nut connected to the cross slide.

13. A lathe as defined in claim 12, characterized in that the feed screw spindle is drivable via a bevel gearing.

14. A lathe as defined in claim 1, characterized in that the cross feed gear has a lifting cam and a cam follower.

15. A lathe as defined in claim 14, characterized in that the lifting cam is mounted so as to be rotatable in relation to the longitudinal slide element and the cross slide guide means and that the cam follower is held on the cross slide.

16. A lathe as defined in claim 14, characterized in that the lifting cam is designed as a hollow cam.

17. A lathe as defined in claim 14, characterized in that the lifting cam is designed as a bead cam.

18. A lathe as defined in claim 14, characterized in that the cam follower makes contact with the lifting cam at two lifting surfaces effective in opposite feed directions.

19. A lathe as defined in claim 18, characterized in that the cam follower has a pair of rollers.

20. A lathe as defined in claim 1, characterized in that the cross slide guide means is adapted to be mounted on the longitudinal guide element from a side opposite the operating area.

21. A lathe as defined in claim 1, characterized in that the cross slide has a receiving means for tools on an upper side facing away from the longitudinal slide element.

22. A lathe as defined in claim 1, characterized in that a longitudinal feed gear is arranged on the slide stand and outside the operating area.

23. A lathe as defined in claim 22, characterized in that the longitudinal feed gear is arranged next to the longitudinal slide element.

24. A lathe as defined in claim 22, characterized in that a longitudinal feed motor is arranged on a side of the longitudinal feed gear facing away from the operating area.

25. A lathe as defined in claim 22, characterized in that the longitudinal feed motor is arranged on a side of the slide stand facing away from the operating area.

26. A lathe as defined in claim 1, characterized in that the longitudinal slide element is guided in the longitudinal guide means and non-rotatably guided by an additional torque support against any rotation about a longitudinal direction of the longitudinal slide element.

27. A lathe as defined in claim 26, characterized in that the torque support has a holding arm extending transversely to the longitudinal slide element, said arm bearing a guide member running on a guide path held on the slide stand.

28. A lathe as defined in claim 27, characterized in that the longitudinal feed gear engages on the holding arm.

29. A lathe as defined in claim 28, characterized in that the longitudinal feed gear has a feed screw spindle extending in Z-direction and a spindle nut and that the spindle nut is held on the holding arm.

30. A lathe as defined in claim 1, wherein:

said cross slide is displaceable transversely to the Z-direction.

31. A lathe, comprising:

at least one workpiece spindle arranged on a machine frame and rotatable about a spindle axis;

said workpiece spindle projecting with its front end into an operating area;

a tool slide comprising (a) a longitudinal slide element guided for displacement in a Z-direction in a longitudinal guide means that is located outside the operating area and arranged on a slide stand of the machine frame, said Z-direction being parallel to said spindle axis, and (b) a transverse slide arranged in the operating area and displaceable in relation to the longitudinal slide element in an X-direction that is transverse to the spindle axis;

said transverse slide being guided on a slide guide means arranged at a front end of the longitudinal slide element and movable by means of a feed gear; wherein:

the longitudinal slide element bears a feed motor for the feed gear in an area located outside the operating area; and said feed motor drives the feed gear by means of a rotary transmission element that extends in a longitudinal direction of the longitudinal slide element.

* * * * *